United States Patent
Sano et al.

(10) Patent No.: US 9,404,444 B2
(45) Date of Patent: Aug. 2, 2016

(54) EXHAUST SYSTEM FOR INTERNAL COMBUSTION ENGINE

(71) Applicant: DENSO CORPORATION, Kariya, Aichi-pref. (JP)

(72) Inventors: Ryo Sano, Kariya (JP); Satoshi Ishigaki, Takahama (JP); Hiroki Shimada, Anjo (JP); Osamu Sato, Takahama (JP)

(73) Assignee: DENSO CORPORATION, Kariya (JP)

( * ) Notice: Subject to any disclaimer, the term of this patent is extended or adjusted under 35 U.S.C. 154(b) by 323 days.

(21) Appl. No.: 14/212,032

(22) Filed: Mar. 14, 2014

(65) Prior Publication Data

US 2014/0311464 A1    Oct. 23, 2014

(30) Foreign Application Priority Data

Apr. 18, 2013 (JP) .................................. 2013-87441

(51) Int. Cl.
*F02M 25/07* (2006.01)

(52) U.S. Cl.
CPC ......... *F02M 25/079* (2013.01); *F02M 25/0772* (2013.01); *F02M 25/0773* (2013.01); *F02M 25/0774* (2013.01); *F02M 25/0776* (2013.01); *F02M 25/0777* (2013.01); *F02M 25/0778* (2013.01); *Y02T 10/121* (2013.01)

(58) Field of Classification Search
CPC .......... F02M 25/0772; F02M 25/0773; F02M 25/0774; F02M 25/0776; F02M 25/0777; F02M 25/0778
USPC ............. 123/568.11, 568.21, 568.23, 568.24, 123/568.25
See application file for complete search history.

(56) References Cited

FOREIGN PATENT DOCUMENTS

| DE | 10 200 603 1028 | | 1/2008 | |
|---|---|---|---|---|
| KR | 20060029846 A | * | 4/2006 | ......... F02M 25/0773 |
| WO | WO 2012/126876 | | 9/2012 | |

* cited by examiner

*Primary Examiner* — Mahmoud Gimie
(74) *Attorney, Agent, or Firm* — Nixon & Vanderhye P.C.

(57) ABSTRACT

In an exhaust system for an internal combustion engine, an output member is configured to transmit power generated by a motor to a valving element via a valve stem. An output shaft is disposed on a rotation central axis of an output gear and coupled with the output gear to be rotatable integrally therewith. A follower is disposed eccentrically relative to a rotation central axis of the output shaft and connected to the output shaft to be rotatable integrally therewith. A first accommodating chamber accommodates at least the valve stem and the follower. A second accommodating chamber accommodates at least the motor and the output gear. A housing includes a housing wall that divides the first chamber from the second chamber. The housing wall includes a first bearing slidably supporting the output shaft in its rotation direction, and a cylindrical first bearing holder holding outer periphery of the first bearing.

16 Claims, 15 Drawing Sheets

EXHAUST SYSTEM FOR INTERNAL COMBUSTION ENGINE

CROSS REFERENCE TO RELATED APPLICATION

This application is based on Japanese Patent Application No. 2013-87441 filed on Apr. 18, 2013, the disclosure of which is incorporated herein by reference.

TECHNICAL FIELD

The present disclosure relates generally to an exhaust system for an internal combustion engine. In particular, the present disclosure relates to an exhaust gas recirculation system for an internal combustion engine (engine).

BACKGROUND

Conventionally, for an exhaust system for an internal combustion engine, for example, there is known an exhaust gas recirculation system (EGR system) that recirculates (flows back) exhaust gas (hereinafter referred to as EGR gas) from an exhaust pipe through an exhaust gas recirculation pipe into an intake pipe of an internal combustion engine (engine) for the purpose of reducing harmful substances (e.g., nitrogen oxide: NOx) contained in exhaust gas discharged from a cylinder of the engine for traveling of a vehicle such as an automobile.

In the EGR system, there is disposed an EGR gas flow rate control valve (hereinafter referred to as an EGR control valve) for variably controlling a flow rate of EGR gas flowing through a EGR flow passage in the exhaust gas recirculation pipe is disposed (see, e.g., WO/2012/126876). This EGR control valve includes an electric motor having a motor shaft and a pinion gear, an intermediate shaft having an intermediate gear which rotates in engagement with the pinion gear, an eccentric shaft having an output gear which rotates in engagement with the intermediate gear, and an eccentric, and a connecting link with a poppet valve, a valve stem, and the eccentric in engagement with each other. The intermediate shaft is disposed laterally as well as near the eccentric shaft such that the eccentric and the connecting link are arranged near the electric motor.

In the conventional EGR control valve, a housing wall does not exist between the output gear and the eccentric, and it is difficult to arrange bearings for slidably supporting the eccentric shaft in its rotation direction. Accordingly, there is caused an insufficient engagement between the intermediate gear and the output gear due to axial deflection of the eccentric shaft. As a result, there is an issue that power of the electric motor is not transmitted effectively to the eccentric and the poppet valve.

SUMMARY

The present disclosure addresses at least one of the above issues.

According to the present disclosure, there is provided an exhaust system for an internal combustion engine, including a housing, a valve, an actuator, a first accommodating chamber, and a second accommodating chamber. The housing includes a flow passage through which exhaust gas from the engine flows. The valve includes a valving element and a valve stem. The valving element is configured to open or close the flow passage. The valve stem supports the valving element. The actuator includes a motor and an output member. The motor is configured to generate power for driving the valve upon supply of electric power to the motor. The output member is configured to transmit the power generated by the motor to the valving element via the valve stem. The valve and the actuator are incorporated in the housing. The output member includes an output gear, an output shaft, and a follower. The output gear is configured to receive the power of the motor so as to rotate. The output shaft is disposed on a central axis of the rotation of the output gear and coupled with the output gear to be rotatable integrally with the output gear. The follower is disposed eccentrically relative to the central axis of the rotation of the output shaft and connected to the output shaft to be rotatable integrally with the output shaft. The first accommodating chamber accommodates at least the valve stem and the follower. The second accommodating chamber accommodates at least the motor and the output gear. The housing further includes a housing wall that divides the first accommodating chamber from the second accommodating chamber. The housing wall includes a first bearing and a cylindrical first bearing holder. The first bearing slidably supports the output shaft in its rotation direction. The first bearing holder holds outer periphery of the first bearing.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
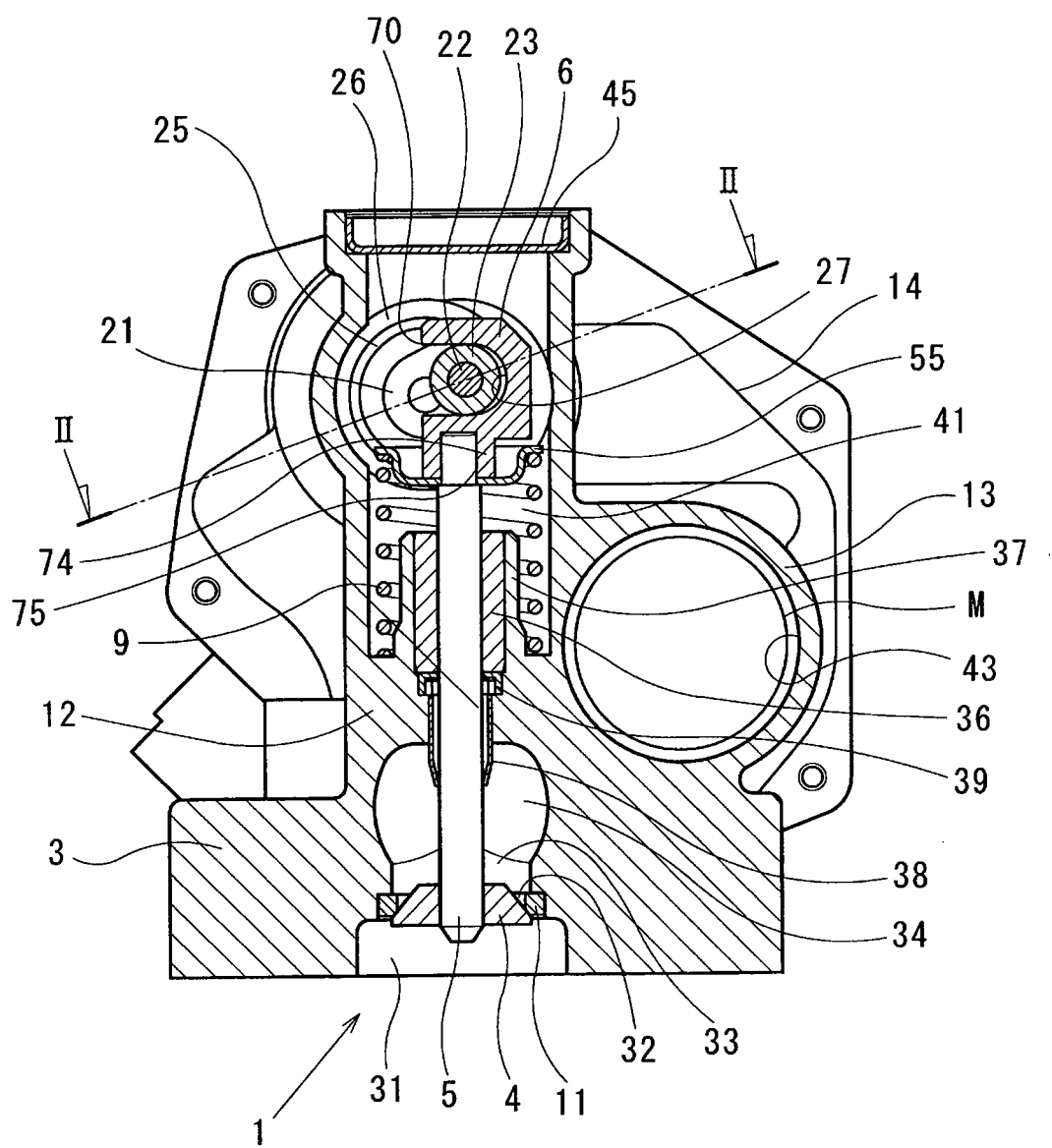
FIG. 1 is a sectional view illustrating an EGR control valve in accordance with a first embodiment.
Figure 2:
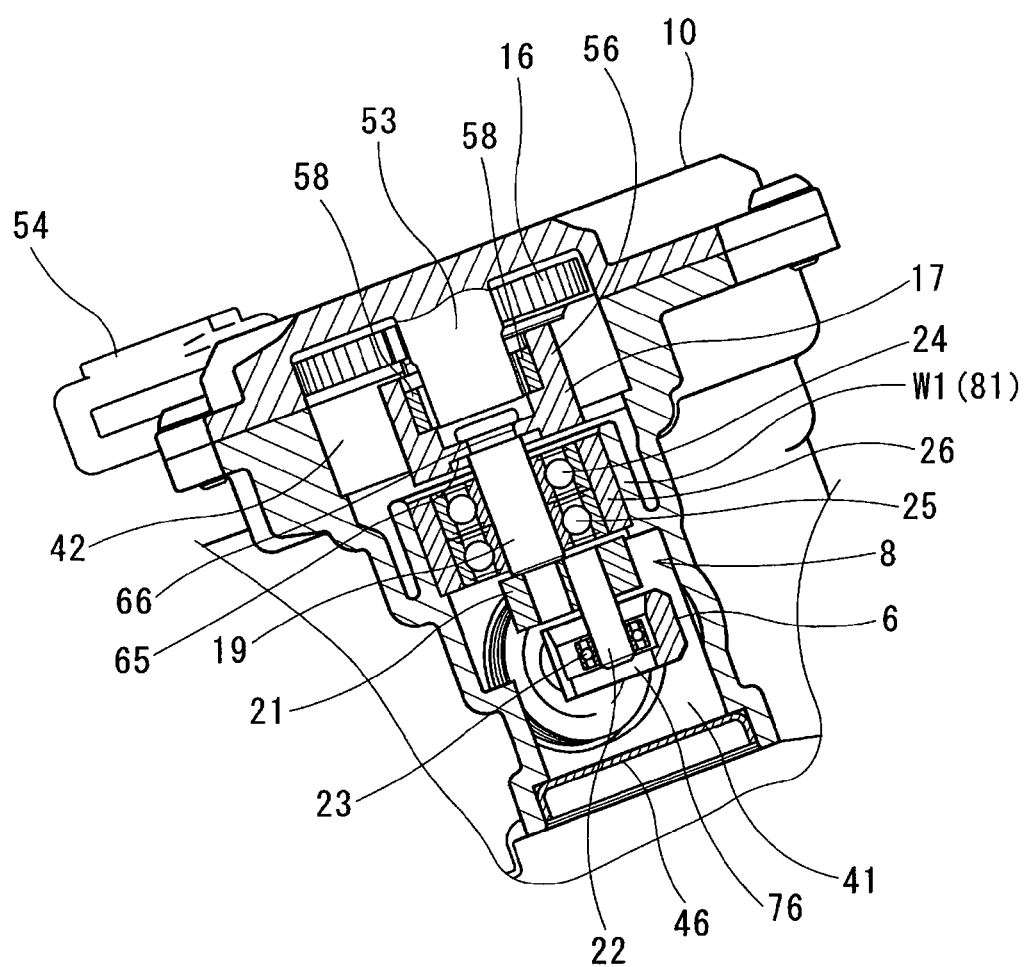
FIG. 2 is a sectional view taken along a line II-II in FIG. 1 according to the first embodiment.
Figure 3:
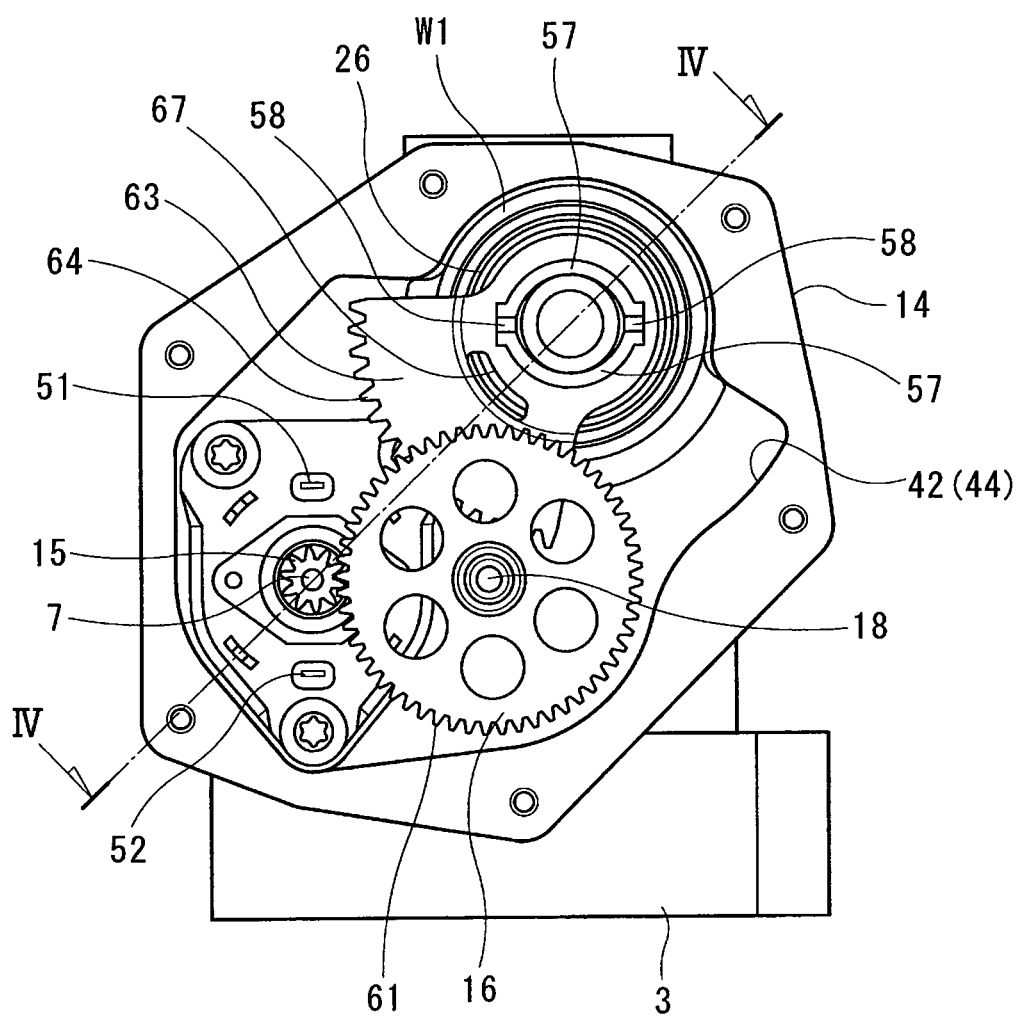
FIG. 3 is a plan view illustrating a state with a sensor cover removed according to the first embodiment.

Embodiments will be described in detail below with reference to the accompanying drawings.

First Embodiment

Configuration of an exhaust system for internal combustion engine of a first embodiment will be described below. FIGS. 1 to 11 illustrate an EGR control valve of the first embodiment that is used for an exhaust gas recirculation system (EGR system) for the engine to which the invention is applied.

The exhaust system of the engine of the present embodiment includes an exhaust gas recirculation system (hereinafter referred to as an EGR system) for recirculating (flowing back) exhaust gas (hereinafter referred to as EGR gas) from an exhaust pipe to an intake pipe of an internal combustion engine (multi-cylinder diesel engine: hereinafter referred to as an engine) disposed in a vehicle such as an automobile. The EGR system includes an EGR gas pipe for flowing EGR gas from an exhaust passage in an exhaust manifold or the exhaust pipe back into an intake passage in an intake manifold or the intake pipe. An EGR gas flow passage, through which EGR gas flows from the exhaust passage into the intake passage, is formed in this EGR gas pipe.

At the EGR gas pipe, there is disposed the EGR control valve for controlling a flow rate of EGR gas flowing through the EGR gas flow passage, through opening and closing operation of an EGR valve 1. The EGR system is used as an EGR valve control device (EGR control device for the engine) for opening-closing controlling the EGR valve 1 of the EGR control valve based on an engine operation condition. This EGR valve control device includes an engine control unit (electronic control unit: hereinafter referred to as an ECU) for controlling an actuator 2 of the EGR control valve in synchronization with another system.

The EGR control valve includes the EGR valve 1 for regulating a flow rate of EGR gas flowing through the EGR gas flow passage, the actuator 2 for reciprocating this EGR valve 1 in its axial direction, and a housing 3 in which the EGR valve 1 and the actuator 2 are accommodated (integrated). The EGR valve 1 includes a valve head (valving element of the EGR control valve) 4, which is a valving element for opening or closing the EGR gas flow passage through which EGR gas flows, and a valve shaft (valve stem of the EGR control valve: hereinafter referred to as valve stem) 5 which is a valve stem for supporting this valve head 4. At a proximal end part of this valve stem 5 in its axial direction, there is provided an input part, to which rotative power of a motor M is transmitted from the actuator 2 through a yoke 6 having a horseshoe shape in section. The yoke 6 is fixed to an outer periphery (outer periphery of upper end in FIG. 1) of the input part of the valve stem 5 by means of press-fitting or welding, for example.

The actuator 2 includes the motor M having a motor shaft 7, a deceleration mechanism (gear train: G) for two-step reducing rotation of the shaft 7 of this motor M, a conversion mechanism (link mechanism: R) for driving and connecting together this deceleration mechanism and the yoke 6, an output member 8 having the deceleration mechanism and a part of the link mechanism to output the power of the motor M toward the yoke 6, a rotation angle detecting device for detecting a rotation angle of this output member 8, and a return spring 9 for urging the valve stem 5 on a side on which the valve head 4 is closed (valve fully-closed side). Between the housing 3 and a sensor cover 10, the housing 3 includes a recessed part in which the actuator 2 is accommodated. The housing 3 includes an annular valve seat 11 with which the valve head 4 can be engaged, a valve body 12 which accommodates the EGR valve 1, a motor case 13 which accommodates the motor M, and a gear case 14 which accommodates the deceleration mechanism.

Details of the housing 3 will be described later. The motor M includes an inner rotor (armature) having the motor shaft 7 which extends in its axial direction (hereinafter referred to as a rotation axis direction), a cylindrical stator surrounding this armature in its circumferential direction, and a pair of feed brushes (hereinafter referred to as brushes) accommodated and held in a brush holder that is fixed to this stator. The deceleration mechanism includes a pinion gear (input gear, motor gear) 15 fixed to an outer periphery of an end of the motor shaft 7 of the motor M, an intermediate gear 16 which rotates in engagement with this pinion gear 15, an output gear (valve gear) 17 which rotates in engagement with this intermediate gear 16, an intermediate shaft 18 disposed in parallel with the motor shaft 7, and an output shaft 19 disposed in parallel with the motor shaft 7 and the intermediate shaft 18.

The output member 8 transmits the rotative power of the motor M to the valve head 4 through the valve stem 5. This output member 8 includes an output gear 17 which rotates upon reception of the rotative power of the motor M, and an output shaft 19 disposed along the central axis of the rotation of this output gear 17 and connected to the output gear 17 to be capable of rotating integrally with the gear 17. The output gears 17 and the output shaft 19 constitute the deceleration mechanism, and the output shaft 19 is configured as an output shaft of the deceleration mechanism. The output member 8 includes an output lever 21 connected to the output shaft 19 to be capable of rotating integrally with the shaft 19, an eccentric pin (hereinafter referred to as a pivot pin) 22 held by a projecting end part of this output lever 21, and a ball bearing (hereinafter referred to as a follower) 23 supported rotatably by an outer periphery of this pivot pin 22. The output lever 21, the pivot pin 22, and the follower 23 constitute the link mechanism.

The output member 8 includes double ball bearings 24, 25 for slidably supporting the output shaft 19 in its rotation direction, and a cylindrical collar 26 press-fitted and fixed around an outer periphery of these double ball bearings 24, 25. The output gear 17, the output shaft 19, the output lever 21, the pivot pin 22, the follower 23, the double ball bearings 24, 25, and the cylindrical collar 26, which constitute the output member 8, are assembled beforehand, and are attached to the housing 3 in a state of this output gear sub-assembly. Meanwhile, the pivot pin 22 and the follower 23 are incorporated into a yoke groove 27 of the yoke 6. The link mechanism includes the yoke 6, the output lever 21, the pivot pin 22, and the follower 23.

The EGR valve 1 is a poppet valve, and includes the annular valve head (valve main body) 4 that is engaged with or disengaged from the valve seat 11 of the housing 3 to close or open the EGR gas flow passage (inlet port 31->flow passage holes 32 to 34->outlet port 35). In the present embodiment, an outer peripheral end surface (sealing surface having a tapered (conical) shape) of the valve head 4 serves as a valve face that is engaged with the valve seat 11. The EGR valve 1 includes the valve stem 5 that reciprocates in the central axis direction of the EGR valve 1 in synchronization with a rotational displacement of the output member 8. In addition, the EGR valve 1 with the valve head 4 and the valve stem 5 configured as an integral part may be employed.

The valve stem 5 extends straightly in the central axis direction of the EGR valve 1 and is joined to the EGR valve 1 and the link mechanism including the yoke 6. This valve stem 5 extends in a direction perpendicular to the motor shaft 7 of the motor M, the intermediate shaft 18 and the output shaft 19. The input part that receives the power of the actuator 2 from the yoke 6 is provided at the proximal end part of the valve stem 5 in its axial direction. An output part that outputs the power of the actuator 2 to the EGR valve 1 is provided at a distal end part of the valve stem 5 in its axial direction.

The annular valve head 4 is fixed to an outer periphery (distal end outer periphery) of the output part of the valve stem 5 by a joining means such as welding. An intermediate part of the valve stem 5 in its axial direction is supported slidably by a bearing holder 37 of the housing 3 through a metal bearing 36. The valve head 4, the valve stem 5, the yoke 6, and the return spring 9 are assembled beforehand and are attached to the housing 3 in a state of this valve sub-assembly.

Exhaust gas particles (particulate matter: PM) such as combustion remnants or carbon are mixed into exhaust gas such as EGR gas. For this reason, a pipe 38 for limiting the entry of the particulate matter (PM) contained in EGR gas between the valve stem 5 and the metal bearing 36 is attached between the intermediate part of the valve stem 5 and the bearing holder 37. An oil seal 39 for preventing an outflow of lubricating grease or lubrication oil which lubricates a sliding part between the valve stem 5 and the metal bearing 36 is attached to an outer periphery of the intermediate part of the valve stem 5.

The oil seal 39 is, for example, a seal which is reinforced by an L-shaped metal ring reinforcement, and includes a sealing rubber (elastic deformation part) made of synthetic rubber and elastically deformable in a radial direction and a thrust direction of the valve stem 5. This oil seal 39 is disposed in a seal press-fitting hole of the bearing holder 37 to surround the valve stem 5 in its circumferential direction. The metal ring reinforcement includes an outer annular part having a cylindrical shape that is press-fitted and fixed to a wall surface of the seal press-fitting hole of the bearing holder 37. An outer peripheral part of this outer annular part is used as a press-fitting and fixing part that is press-fitted and fixed liquid-tightly to the seal press-fitting hole of the bearing holder 37. The outer annular part is in contact with a first level difference (bottom part) of the bearing holder 37 so as to limit a press-fitting and fixing position of the oil seal 39. The sealing rubber includes a seal lip that is in sliding contact with an outer peripheral surface (sliding surface) of the valve stem 5, and has a dust seal function of liquid-tightly and air-tightly sealing a clearance between an inner periphery of the bearing holder 37 and the outer periphery of the valve stem 5. This sealing rubber is disposed inside the bearing holder 37 to surround the valve stem 5 in its circumferential direction.

The valve body 12 movably accommodating the EGR valve 1 (valve head 4, valve stem 5), the yoke 6, the return spring 9, and so forth, are formed integrally with the housing 3. A coupling flange (not shown) is provided on a lower end side (valve seat 11-side) of this valve body 12 in FIG. 1. This coupling flange includes a coupling end surface that is attached to an attaching member (fixing member) of the EGR control valve, and is fastened and fixed to an attachment surface of the fixing member using a fastening tool such as a bolt. Accordingly, the EGR control valve is fixed to the fixing member on the engine-side (vehicle side).

The inlet port 31, the flow passage holes 32 to 34, and the outlet port 35, which constitute the EGR gas flow passage, are formed inside the valve body 12. The valve seat 11 is press-fitted and fixed to a cylindrical partition wall (separating part) of the valve body 12 for dividing the inlet port 31 from the flow passage hole 33. A valve seat having a truncated cone shape (tapered shape) with which the valve head 4 can be engaged is formed at an opening peripheral edge of this valve seat 11. Inside the valve seat 11, there is formed a flow passage hole (valve hole of the EGR control valve) 32 which communicates between the inlet port 31 and the flow passage hole 33 and through which EGR gas passes. The inlet port 31, the flow passage holes 32 to 34, and the outlet port 35 constitute an exhaust gas recirculation route (flow passage) through which EGR gas (exhaust gas) flows. The cylindrical bearing holder 37 for holding an outer periphery of the metal bearing 36 is formed integrally with the valve body 12. This bearing holder 37 is disposed to surround the metal bearing 36 in its circumferential direction.

The metal bearing 36 is a cylindrical oil-impregnated sintered bearing (second bearing, metal bush) with lubrication oil (lubricating grease, lubricating oil) impregnated therein. This metal bearing 36 slidably supports the valve stem 5 in its displacement direction. Inside this metal bearing 36, a slide hole for slidably supporting the outer peripheral surface of the valve stem 5 in its displacement direction is formed through the metal bearing 36. A sliding clearance for smooth reciprocation movement of the valve stem 5 is provided between the outer peripheral surface of the valve stem 5 and an inner peripheral surface of the metal bearing 36. The metal bearing 36 includes an outer annular part having a cylindrical shape that is press-fitted and fixed to the wall surface of the bearing press-fitting hole of the bearing holder 37. An outer peripheral part of this outer annular part is used as a press-fitting and fixing part that is air-tightly press-fitted and fixed into the bearing press-fitting hole of the bearing holder 37. The outer annular part is in contact with a second level difference of the bearing holder 37 so as to limit a press-fitting and fixing position of the metal bearing 36.

The bearing holder 37 is a cylindrical second bearing holder for holding the outer annular part of the metal bearing 36. Inside this bearing holder 37, there is provided a valve stem accommodating hole into which the valve stem 5 is fitted and inserted to be reciprocatable in its displacement direction. For this valve stem accommodating hole, there are provided a bearing press-fitting hole into which the outer annular part of the metal bearing 36 is press-fitted, and a seal press-fitting hole into which the outer annular part of the oil seal 39 is press-fitted. The bearing holder 37 is formed cylindrically to surround the metal bearing 36 in its circumferential direction.

Figure 4:
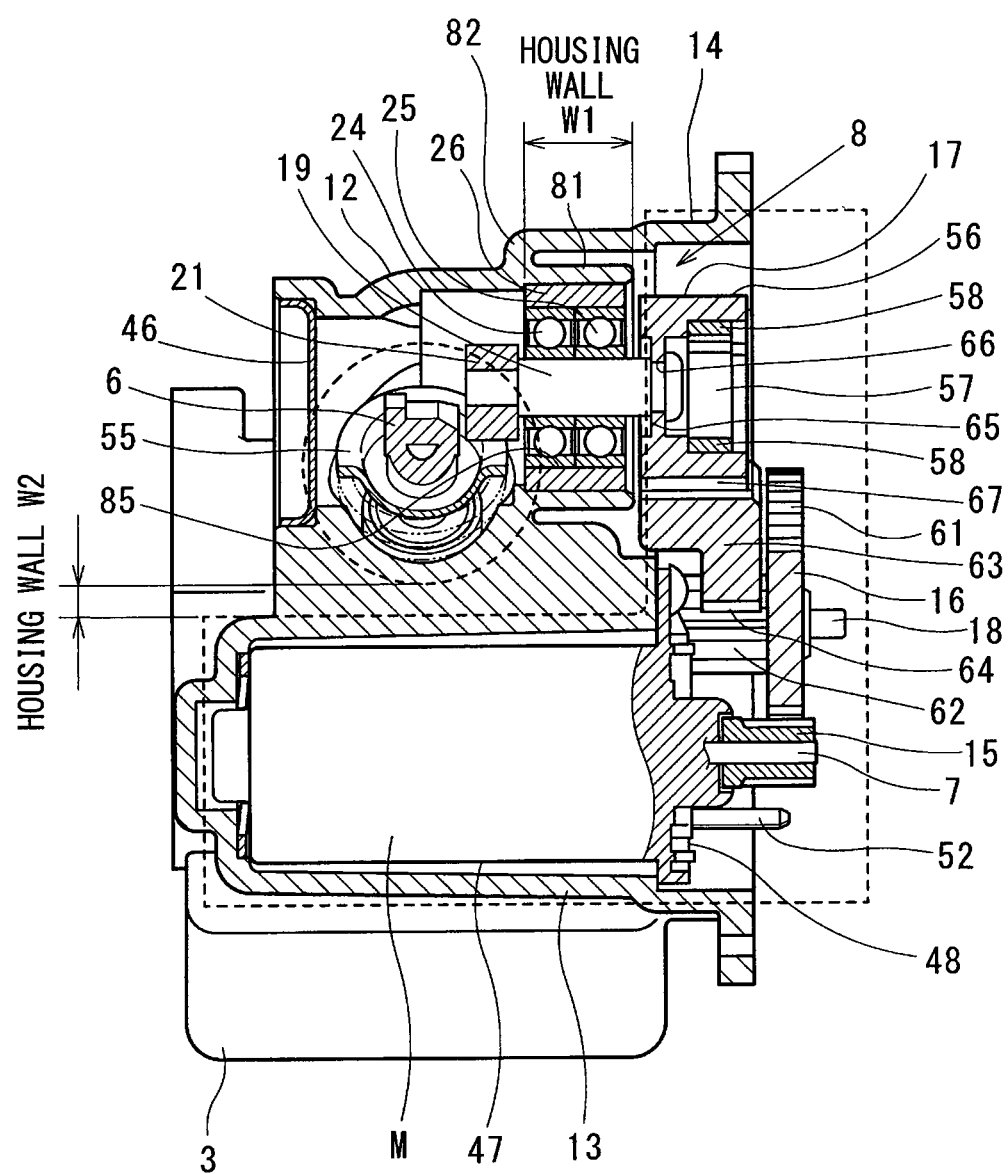
FIG. 4 is a sectional view taken along a line IV-IV in FIG. 3 according to the first embodiment.

Housing walls W1, W2 for dividing a first accommodating chamber 41 from a second accommodating chamber 42 are provided for the housing 3, particularly between the valve body 12 and the gear case 14. The first accommodating chamber 41 is a recessed part in which the EGR valve 1 and the conversion mechanism surrounded with a short dashes line in FIG. 4 are accommodated. The EGR valve 1 and the conversion mechanism, which are accommodated in this first accommodating chamber 41, are at least the valve head 4, the valve stem 5, the yoke 6, the output lever 21, the pivot pin 22, the follower 23, and so forth. The second accommodating chamber 42 is a recessed part in which the motor M and the deceleration mechanism surrounded with a short dashes line in FIG. 4 are accommodated between the recessed part and the sensor cover 10. The motor M and the deceleration mechanism, which are accommodated in this second accommodating chamber 42, are at least the motor M, the pinion gear 15, the intermediate gear 16, the output gear 17, and so forth.

The second accommodating chamber 42 includes a motor accommodating chamber 43 in which the motor M is accommodated, and a gear accommodating chamber 44 in which the deceleration mechanism is accommodated. The housing wall W1 divides the first accommodating chamber 41 from the second accommodating chamber 42, especially the gear accommodating chamber 44. The housing wall W2 divides the first accommodating chamber 41 from the second accommodating chamber 42, especially the motor accommodating chamber 43. An opening part for inserting the valve sub-assembly into the first accommodating chamber 41 at the time of attachment is provided for the housing 3. This opening part is closed by a plug or a cap 45. In addition, an opening part is provided for the housing 3. This opening part is covered by a plug or a cap 46.

The motor case 13 having a cylindrical shape with a bottom part and accommodating and holding the motor M is formed integrally with the housing 3. This motor case 13 includes a cylindrical side wall part surrounding the cylindrical yoke 47 of the motor M in its circumferential direction, and an opening part (motor insertion opening) that opens on one end side of this side wall part and is for inserting the motor M into the motor accommodating chamber 43 at the time of attachment. This motor insertion opening is closed by a front bracket 48 of the motor M. This front bracket 48 is fastened and fixed to an opening peripheral edge of the motor insertion opening of the motor case 13 using a bolt or the like. Accordingly, the motor M is accommodated and held in the motor accommodating chamber 43.

The gear case 14 which accommodates the deceleration mechanism is provided for the housing 3. This gear case 14 includes an opening part for inserting the actuator 2 into the gear accommodating chamber 44 at the time of attachment. This opening part is covered with the sensor cover 10 made of synthetic resin. For the sensor cover 10, there are provided a connector for internal connection for making an electric connection between a pair of (first and second) brush terminals 51, 52 projecting from the front bracket 48 of the motor M and a pair of (first and second) motor terminals (not shown), and a connector for external connection for making an electric connection between the pair of (first and second) motor terminals and sensor terminals of an EGR opening degree sensor 53, and an external circuit (ECU and battery).

For an inner surface of the sensor cover 10, there is provided a connector case (not shown) of the connector for internal connection accommodating one end (internal connection part) of the pair of (first and second) motor terminals with the one end exposed. For an outer surface of the sensor cover 10, there are provided the other end (external connection part) of the pair of (first and second) motor terminals, and a connector case 54 of the connector for external connection accommodating ends (external connection parts) of the sensor terminals with the ends exposed. Respective intermediate parts of the pair of (first and second) motor terminals, and the most part of the sensor terminals are insert-molded in the sensor cover 10. The pair of (first and second) motor terminals and the sensor terminals constitute a connector terminal (external connection terminal) of the connector for internal connection or the connector for external connection.

Details of the actuator 2 of the present embodiment will be described with reference to FIGS. 1 to 11. The actuator 2 includes the return spring 9 for urging the EGR valve 1 in a valve-closing (fully closing) direction, the motor M which generates the rotative power (torque) for reciprocating the EGR valve 1 upon supply of electric power, the deceleration mechanism for two-step reducing the rotation of the motor shaft 7 of this motor M to transmit the reduced rotation to the output shaft 19, a power conversion mechanism (link mechanism) for converting rotational reciprocating (rotation) movement of the output gear 17 of this deceleration mechanism into linear reciprocating motion of the EGR valve 1 (reciprocating movement of the EGR valve 1 in its axial direction), and the rotation angle detecting device for detecting the rotation angle of the output shaft 19.

The return spring 9 is disposed to spirally (helically) surround an upper end side of the valve stem 5 in FIG. 1 and the bearing holder 37. This return spring 9 includes a coil part that is wound spirally between a spring seat part of an annular spring seat 55 that is engaged with a level difference (annular level difference) of the valve stem 5 on its upper end side, and a spring seat part of a bottom part of the housing 3 (bottom part of a cylindrical recessed groove radially outward of the bearing holder 37). The return spring 9 is a coiled compression spring that generates resilient force for urging the valve head 4 in its valve-closing direction, against the valve stem 5.

One end side of the coil part of the return spring 9 in its winding direction is engaged with or held by the spring seat part of the spring seat 55. The other end side of the coil part of the return spring 9 in its winding direction is engaged with or held by the spring seat part of the housing 3. The bearing holder 37 has a function as a spring inner periphery guide for guiding (holding) a coil inner diameter of the coil part of the return spring 9. Details of the motor M of the present embodiment will be described with reference to FIGS. 1 to 11. The motor M is accommodated and held in the motor accommodating chamber 43 of the cylindrical motor case 13 having a bottom part and formed integrally with the housing 3. The front bracket 48 is connected to a front side of the cylindrical yoke 47. The motor M is a DC motor having a brush with an inner rotor disposed on an inner peripheral side of an outer stator to be rotatable relatively thereto, and includes the armature having the motor shaft 7 extending straightly in the rotation axis direction, the cylindrical stator surrounding this armature in its circumferential direction (motor circumferential direction), the brush holder fixed to this stator, and a pair of (first and second) brushes in pressing contact with a commutator of the armature to feed power to an armature coil.

The stator includes the cylindrical yoke 47 having a bottom part that rotatably accommodates the motor shaft 7 of the armature, and permanent magnets (field magnets) fixed to an inner peripheral surface of this cylindrical yoke 47. The armature is disposed radially outward of the stator with a predetermined gap therebetween. This armature includes the motor shaft 7 supported rotatably by a bearing supporting part (bearing holder) of the cylindrical yoke 47 and a bearing supporting part (bearing holder) of the plate-shaped front bracket 48 through bearings, an armature core formed by stacking magnetic steel plates in the rotation axis direction of this motor shaft 7, an armature winding (armature coil, rotor coil) wound around this armature core, and the commutator in pressing contact with the pair of (first and second) brushes.

One (first) brush of the pair of (first and second) brushes is electrically-connected to a positive electrode side (VCC side) of an external power (battery) disposed in a vehicle such as an automobile via an electric power supply line including the first brush terminal 51, and a first terminal of the connector for external connection. The other one (second) brush is electrically-connected to a negative electrode side (ground side, GND side) of the external power (battery) via an electric power supply line including the second brush terminal 52 and a second terminal of the connector for external connection. The two (first and second) brush terminals 51, 52 include internal connection parts conductively joined to the first and second brushes (conductors) connected to the armature coil. The respective external connection parts of the two (first and second) brush terminals 51, 52 pass through the front bracket 48 to project into the second accommodating chamber 42, especially into the motor accommodating chamber 43. This projecting part is conductively joined to the first and second motor terminals of the connector for external connection.

The motor M which is a power source of the actuator 2 is electrically-connected to the external power (battery) via a motor drive circuit that is electronically-controlled by the ECU. For the ECU, there are provided a central processing unit (CPU) for performing control processing and arithmetic processing, a storage device (memory such as a read only memory (ROM) and a random access memory (RAM)) for storing a control program and various kinds of control data (e.g., map), and a microcomputer with a known structure including functions of an input circuit (input part), an output circuit (output part), and a power supply circuit, and a timer.

When an ignition switch is turned on (IG-ON), the ECU controls energization of the motor M of the EGR control valve based on the control program stored in the memory of the microcomputer. The ECU is configured such that sensor output signals from various kinds of sensors such as an EGR opening degree sensor 53, an airflow meter, a crank angle sensor, an accelerator opening degree sensor, a throttle opening degree sensor, an intake air temperature sensor, a coolant temperature sensor, and an exhaust gas sensor (air-fuel ratio sensor, oxygen concentration sensor) are A/D converted by an A/D conversion circuit, and then inputted into the microcomputer.

The rotation angle detecting device includes a cylindrical magnetic circuit part provided for a cylindrical boss 56 of the output gear 17 to be rotatable integrally therewith, and the EGR (valve) opening degree sensor 53 for measuring a rotation angle of this magnetic circuit part to detect a valve opening degree of the EGR control valve, and detects a change of a relative rotation angle between the magnetic circuit part and the EGR opening degree sensor 53 using a magnetic change made to the EGR opening degree sensor 53 by the magnetic circuit part.

The EGR opening degree sensor 53 is disposed at a sensor mounting portion of the sensor cover 10. This EGR opening degree sensor 53 is configured mainly as a Hall IC which outputs to the ECU an analog voltage signal in accordance with a magnetic flux density interlinking with a magnetism sensitive surface of a semiconductor Hall element. Instead of the Hall IC, a Hall element alone, or a non-contact type magnetism detecting element such as a magnetic resistance element may be used.

The magnetic circuit part is fixed to an inner periphery of the cylindrical boss 56 by, for example, an adhesive. In case of the cylindrical boss 56 being a synthetic resin, the magnetic circuit part may be insert-molded into the cylindrical boss 56. This magnetic circuit part includes a pair of partial cylindrical yokes 57 which are divided into two parts in a diameter direction of the cylindrical boss 56, and a pair of magnets (permanent magnets) 58 arranged with their magnetic poles facing in the same direction at this divided part (opposed part) of the yokes 57.

Details of the deceleration mechanism of the present embodiment will be described with reference to FIGS. 1 to 11. As described above, the deceleration mechanism includes the pinion gear 15, the intermediate gear 16, the output gear 17, the intermediate shaft 18, and the output shaft 19. The three reduction gears are rotatably accommodated in the gear accommodating chamber 44 which is an internal space formed between the recessed part of the gear case 14 and the recessed part of the sensor cover 10. The pinion gear 15 is formed integrally from metal or synthetic resin. This pinion gear 15 is fixed around a distal end outer periphery of the motor shaft 7 by press-fitting or the like.

The intermediate gear 16 is formed integrally from metal or synthetic resin. This intermediate gear 16 is fitted around an outer periphery of the intermediate shaft 18 to be rotatable relatively thereto. This intermediate gear 16 includes a cylindrical part that is fitted rotatably around the outer periphery of the intermediate shaft 18 to rotate around the central axis of the intermediate shaft 18. A large diameter gear (intermediate gear teeth) 61 in engagement with the pinion gear 15 is formed at one end portion of this cylindrical part in its axial direction. A small diameter gear (intermediate gear teeth) 62 in engagement with the output gear 17 is formed at the other end portion of the cylindrical part in its axial direction.

The output gear 17 is formed integrally from metal or synthetic resin. The cylindrical boss 56 is formed integrally at an inner peripheral part of this output gear 17. The output gear 17 includes a teeth formation part 63 having a partially cylindrical shape (fan shape) radially outward of the cylindrical boss 56. Output gear teeth 64 in engagement with the small diameter gear 62 of the intermediate gear 16 are formed in fan-like fashion by a predetermined angle at an outer periphery of this teeth formation part 63. A level difference in a shape of a circular arc is provided between an inner peripheral portion and an outer peripheral portion of the teeth formation part 63 (at an intermediate portion of the teeth formation part 63).

A joining portion 65 is provided integrally for the output gear 17 to close an opening part of the cylindrical boss 56 on its one end side (valve side). This joining portion 65 has an annular shape with smaller thickness than the cylindrical boss 56. A fitting hole 66 having a bolt width (structure for preventing the output shaft 19 from spinning free, or anti-rotation configuration) is formed through a central part of the joining portion 65. An input part of the output shaft 19 (first projecting shaft part of the output shaft 19) is fitted and fixed to this fitting hole 66 with the input part prevented from rotating.

Between an outer periphery of the cylindrical boss 56 and an inner periphery of the teeth formation part 63, the output gear 17 includes a circular arc window 67 through which the outer diameter of the cylindrical collar 26 can be viewed. A part of a pressing jig for holding an annular end face of the cylindrical collar 26 at the time of attachment of the cylindrical collar 26 (at the time of press-fitting) to the housing wall W1 of the housing 3 can be inserted into this circular arc window 67. The intermediate shaft 18 is formed integrally from metal or synthetic resin. One end of this intermediate shaft 18 in its axial direction is press-fitted (fixed) to a fitting recessed part of the cylindrical boss of the gear case 14 of the housing 3. The other end of the intermediate shaft 18 in its axial direction is fitted in a fitting recessed part of the cylindrical boss of the sensor cover 10.

The output shaft 19 is formed integrally from metal. This output shaft 19 is accommodated rotatably or slidably inside the housing wall W1 of the housing 3 via the cylindrical collar 26 and the double ball bearings 24, 25. The output shaft 19 includes the first and second projecting shaft parts (diameter small shaft parts) respectively on its both sides in the rotation axis direction of the shaft 19. Between the first and second projecting shaft parts, there is provided an axial part (intermediate shaft part, diameter large shaft part having larger outer diameter than the first and second projecting shaft parts) disposed inside a bearing accommodating hole (to be hereinafter described) of the housing wall W1 of the housing 3.

The first projecting shaft part is provided at a proximal end side (input part) of the output shaft 19 in its axial direction (rotation axis direction), and has bolt width. The first projecting shaft part may have a quadrangular shape in cross-section. The second projecting shaft part is provided at a distal end side (output part) of the output shaft 19 in its axial direction, and has a circular cross section. The second projecting shaft part may have bolt width. Respective inner rings of the double ball bearings 24, 25 are fitted and held around an outer periphery of the intermediate shaft part of the output shaft 19 by press-fitting.

Details of the link mechanism of the present embodiment will be described with reference to FIGS. 1 to 11. As described above, the link mechanism includes the yoke 6, the output lever 21, the pivot pin 22, and the follower 23. The yoke 6 is formed integrally from metal. Upon reception of the rotative power of the motor M from the pivot pin 22 through the follower 23, this yoke 6 reciprocates in the axial direction of the valve stem 5. The yoke 6 is connected to the valve stem 5 to be movable integrally with the stem 5. The yoke 6 includes an input part having a horseshoe shape in section that receives the power of the output member 8 via the follower 23, and an output part that transmits the power of the output member 8 to the valve stem 5.

Figure 6:
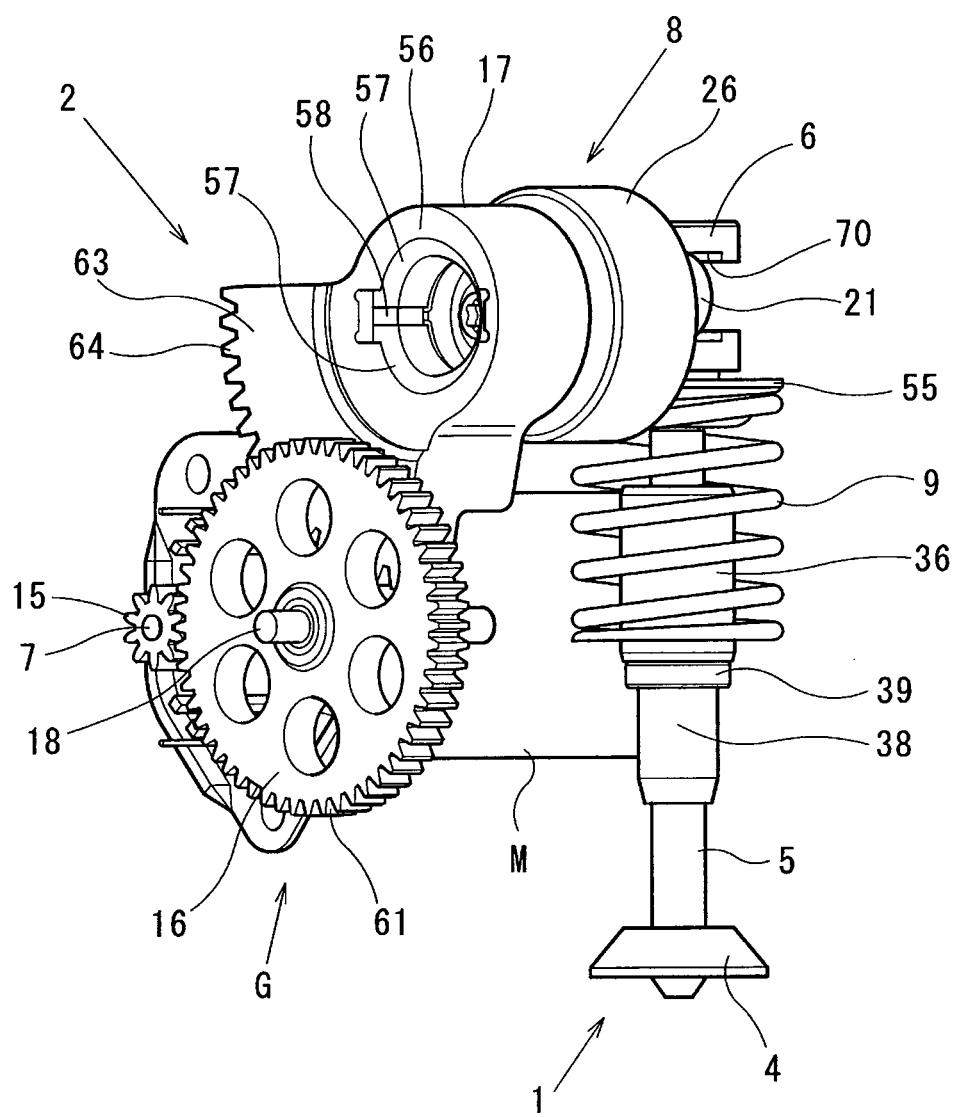
FIG. 6 is a perspective view illustrating an actuator and an EGR valve according to the first embodiment.
Figure 7:
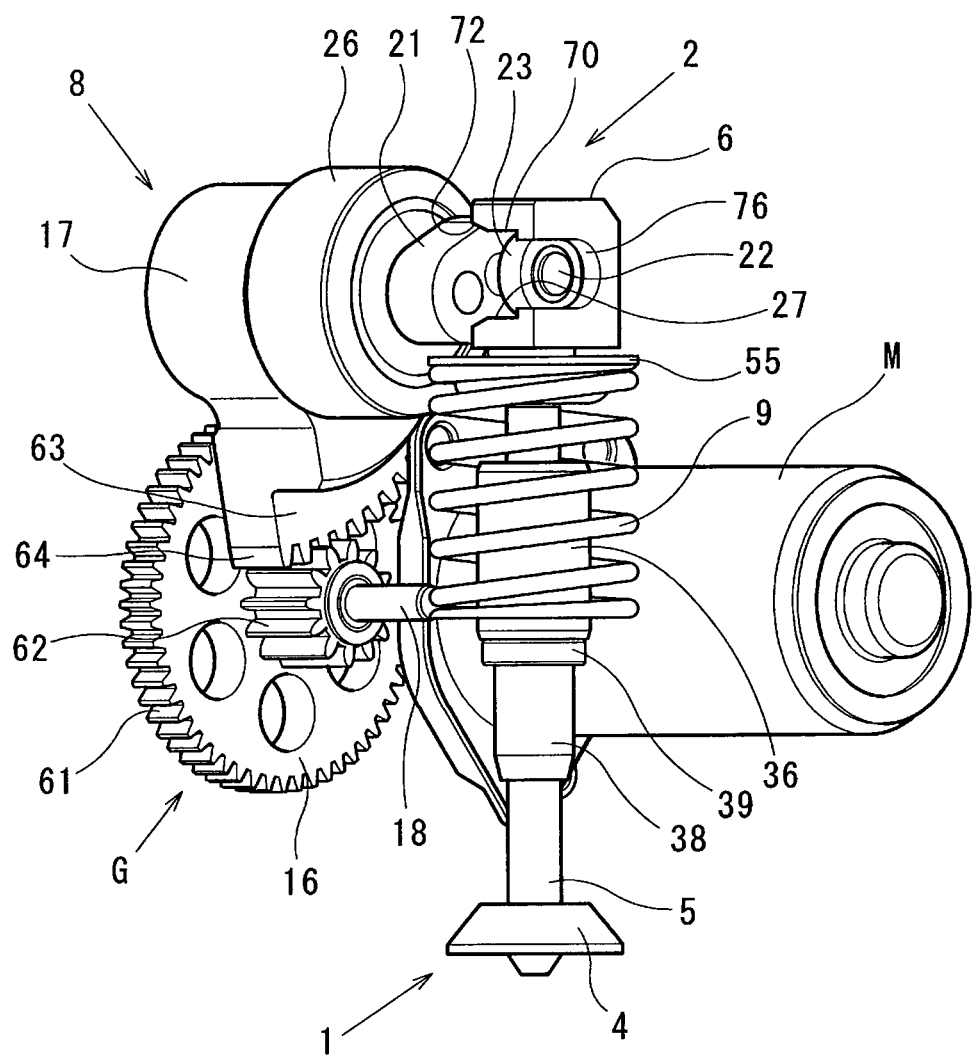
FIG. 7 is a perspective view illustrating the actuator and the EGR valve of the first embodiment.

Inside the input part of the yoke 6, as illustrated in FIGS. 6 and 7, there is formed a U-shaped yoke groove 27 that is provided by connecting together two parallel flat groove side faces by a recessed curved surface (groove bottom surface). This yoke groove 27 is a recessed groove that opens on at least side faces of the two surfaces and extends from an opening part 70 of a side face of one surface of the two surfaces toward the rear side. The yoke groove 27 includes an axial groove (recessed groove extending in a direction parallel to the rotation axis direction of the output shaft 19) into which the follower 23 which is supported by the pivot pin 22 can be detachably inserted. Thus, the input part of the yoke 6 is configured as a U-shaped follower accommodating part (or engagement part) that accommodates the follower 23 slidably. A groove depth of the yoke groove 27 from its opening side toward rear side is larger than diameter of the follower 23. Curvature radius of the recessed curved surface is generally the same as or larger than curvature radius of an outer peripheral surface of the follower 23.

The input part of the yoke 6 has a polyhedral shape (horseshoe shape in section) having at least four (first to fourth) side surfaces in addition to two surfaces which are opposed in an insertion direction in which the pivot pin 22 and the follower 23 are inserted at the time of attachment. The input part of the yoke 6 may be formed into an annular shape in section so as to surround the follower 23 in its circumferential direction.

The yoke groove 27 includes an opening part 71 for inserting the follower 23 into the yoke groove 27 with the output member 8 being linearly moved at the time of attachment of the output member 8, especially the follower 23, to the yoke 6. This opening part 71 is open in a direction perpendicular to the axial direction of the valve stem 5, particularly, in the opposite direction from the insertion direction in which the pivot pin 22 and the follower 23 are inserted at the time of attachment. As illustrated in FIGS. 2, 5, 9 to 11, for the opening part 71, there is provided a taper guide surface 72 whose opening area gradually becomes small from the opening side of the yoke 6 toward the rear side of the yoke groove 27 and which leads (guides) the follower 23 into the yoke groove 27.

A fitting part 74 having a (or angulated) cylindrical shape with a bottom portion is provided integrally with the output part of the yoke 6. Inside this fitting part 74, there is formed a press-fitting groove 75 into which the proximal end part (input part) of the valve stem 5 in its axial direction is press-fitted. This press-fitting groove 75 includes an opening part for inserting the input part of the valve stem 5 into the press-fitting groove 75 with the valve stem 5 being linearly moved at the time of attachment of the valve stem 5 to the yoke 6.

For the input part, there is provided an opposed surface which has a slit and to which the follower 23 is opposed. An end surface of the pivot pin 22 can be seen through this slit. A side opening part 76 that opens in the direction perpendicular to the axial direction of the valve stem 5 is provided on a first side face of the input part. A level difference 77 for limiting an accommodating position of the follower 23 is provided at an inner periphery of the input part. The proximal end part (input part) of the valve stem 5 in its axial direction may be fixed to the fitting part 74 of the yoke 6 by means of crimping or welding, for example. The valve stem 5 and the yoke 6 may be configured as a single component.

The output lever 21 is formed integrally from metal. This output lever 21 is provided to project radially outward of the output shaft 19. The output lever 21 is a linking lever for driving and connecting together the output shaft 19, and the pivot pin 22 and the follower 23 to transmit the rotative power of the motor M to the pivot pin 22 and the follower 23. A first fitting hole into which the second projecting shaft part of the output shaft 19 is press-fitted such that the second projecting shaft part passes through the first fitting hole in its axial direction is respectively provided at a proximal end part of the output lever 21. Accordingly, the output lever 21 is connected to the output shaft 19 to be rotatable integrally with the shaft 19.

A second fitting hole into which the pivot pin 22 is press-fitted such that the pivot pin 22 passes through the second fitting hole in its axial direction is respectively provided at a distal end part of the output lever 21. Accordingly, the pivot pin 22 is connected to the output lever 21 to be rotatable integrally with the lever 21. The second fitting hole is provided at a position that is eccentric by a predetermined distance from the central axis of the rotation of the second projecting shaft part of the output shaft 19. The pivot pin 22 is formed from metal, and is driven into the second fitting hole of the output lever 21 to be press-fitted and fixed to the output part of the output lever 21. This pivot pin 22 rotatably supports the follower 23. Together with the follower 23, this pivot pin 22 is inserted into the yoke groove 27 of the yoke 6.

The follower 23 is a ball bearing including an inner ring press-fitted and fixed around an outer periphery of the pivot pin 22, an outer ring in sliding contact with a groove side face of the yoke groove 27 of the yoke 6, and steel balls slidably accommodated between the two bearing rings of the inner ring and outer ring. The follower 23 is supported rotatably by the outer periphery of the pivot pin 22, and is inserted slidably (rollably) into the yoke groove 27 of the yoke 6. This follower 23 is provided at a position that is eccentric by a predetermined distance from the central axis of the rotation of the second projecting shaft part of the output shaft 19.

Figure 5:
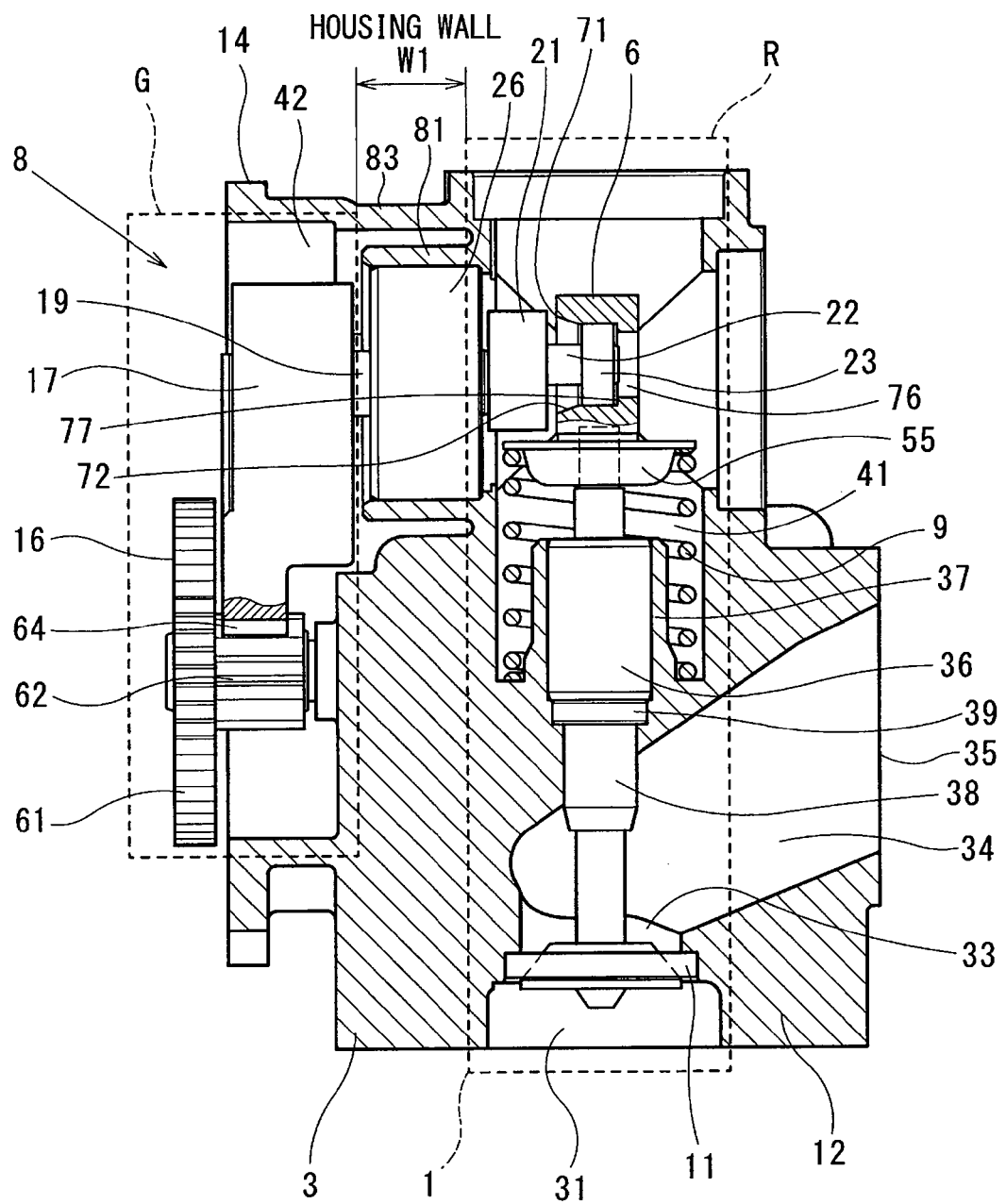
FIG. 5 is a sectional view illustrating the EGR control valve of the first embodiment.

Details of the housing walls W1, W2 of the housing 3 of the present embodiment will be described in reference to FIGS. 4 and 5. The housing walls W1, W2 for dividing the first accommodating chamber 41 from the second accommodating chamber 42 are provided for the housing 3. The housing wall W1 is a partition wall having a sleeve shape provided to project from the inner wall part of the housing 3 toward the first accommodating chamber 41. The EGR valve 1, particularly, the valve stem 5, the yoke 6, the output lever 21, the pivot pin 22, and the follower 23 are accommodated movably in the first accommodating chamber 41. The motor M and the deceleration mechanism (e.g., the pinion gear 15, the intermediate gear 16, the output gear 17) are accommodated in the second accommodating chamber 42.

As described above, the respective inner rings of the double ball bearings 24, 25 are fitted and held around the outer periphery of the intermediate shaft part of the output shaft 19 by press-fitting. The housing wall W1 includes a bearing holder (first bearing holder) 81 for holding the double ball bearings 24, 25 via the cylindrical collar 26, and connected to an outer wall part 83 of the housing 3 through an annular connecting wall (connecting part) 82. The bearing holder 81 is formed cylindrically to surround the intermediate shaft part of the output shaft 19, the double ball bearings 24, 25, and the cylindrical collar 26. A bearing accommodating hole (axial hole) 84 extending straightly in the rotation axis direction (axial direction) of the output member 8, especially the output shaft 19, is formed in this bearing holder 81. This bearing accommodating hole 84 is configured as a shaft accommodating hole into which the output shaft 19 is rotatably fitted and inserted.

The bearing accommodating hole 84 includes a collar accommodating hole for accommodating the double ball bearings 24, 25 and the cylindrical collar 26. This collar accommodating hole is a collar press-fitting hole into which an outer annular part of the cylindrical collar 26 is press-fitted, and is configured as a bearing press-fitting hole into which the respective outer rings of the double ball bearings 24, 25 are press-fitted via the cylindrical collar 26. Each press-fitting hole is formed on the same axis line as the bearing accommodating hole 84. A level difference for engaging the cylindrical collar 26 is provided for an inner periphery of the bearing holder 81.

The double ball bearings 24, 25 serve as a first bearing (roller bearing) that is accommodated in the bearing accommodating hole 84 of the bearing holder 81 to slidably support the output shaft 19 of the output member 8 in its rotation direction. The double ball bearings 24, 25 include the inner ring press-fitted and fixed around the outer periphery of the intermediate shaft part of the output shaft 19, the outer ring press-fitted and fixed into the inner periphery of the cylindrical collar 26, and the steel balls slidably accommodated between the two bearing rings of the inner ring and outer ring.

The respective inner rings of the double ball bearings 24, 25 are configured as a press-fitting and fixing part that is air-tightly press-fitted and fixed around the outer periphery of the intermediate shaft part of the output shaft 19. The respective outer rings of the double ball bearings 24, 25 are configured as a press-fitting and fixing part that is air-tightly press-fitted and fixed into the inner periphery of the cylindrical collar 26. The double ball bearings 24, 25 include two lip seals (sealants) attached respectively between the two bearing rings and on both end sides of the steel balls in the rotation axis direction, and two retainers for preventing separation of the steel balls. A rolling element such as a roller may be employed instead of the steel ball. A reinforcing material (attachment ring) made of metal may be used instead of the two lip seals.

The cylindrical collar 26 of the present embodiment is formed integrally from metal or synthetic resin. This cylindrical collar 26 is press-fitted and fixed between an outer periphery of the respective outer rings of the double ball bearings 24, 25 and an inner periphery of the housing wall W1 of the housing 3. The cylindrical collar 26 has an outer diameter equal to or larger than an enveloping circle with the shaft center (central axis of rotation) of the output shaft 19 serving as its center enveloping the output lever 21, the pivot pin 22, and the follower 23.

The cylindrical collar 26 is configured as a press-fitting and fixing part that is air-tightly press-fitted and fixed around the outer periphery of the respective outer rings of the double ball bearings 24, 25. In addition, the cylindrical collar 26 is configured as a press-fitting and fixing part that is air-tightly press-fitted and fixed into the inner periphery of the housing wall W1. The cylindrical collar 26 is in contact with a level difference of the housing wall W1 to limit press-fitting and fixing positions of the double ball bearings 24, 25 and the cylindrical collar 26. The cylindrical collar 26 is press-fitted between the outer periphery of the respective outer rings of the double ball bearings 24, and the inner periphery of the housing wall W1 of the housing 3.

A bearing accommodating hole 85 surrounding the output shaft 19 in its circumferential direction is formed in the cylindrical collar 26. For the inner periphery of the cylindrical collar 26, there are provided two (first and second) press-fitting holes that are formed on the same axis line as the bearing accommodating hole 85. These first and second press-fitting holes are provided adjacent to each other in the rotation axis direction of the output shaft 19. The respective outer rings which are outer annular parts of the double ball bearings 24, 25 are press-fitted and fixed into the two (first and second) press-fitting holes. The two (first and second) press-fitting holes may be arranged adjacent to each other in the rotation axis direction of the output shaft 19 with a predetermined distance therebetween.

Figure 10:
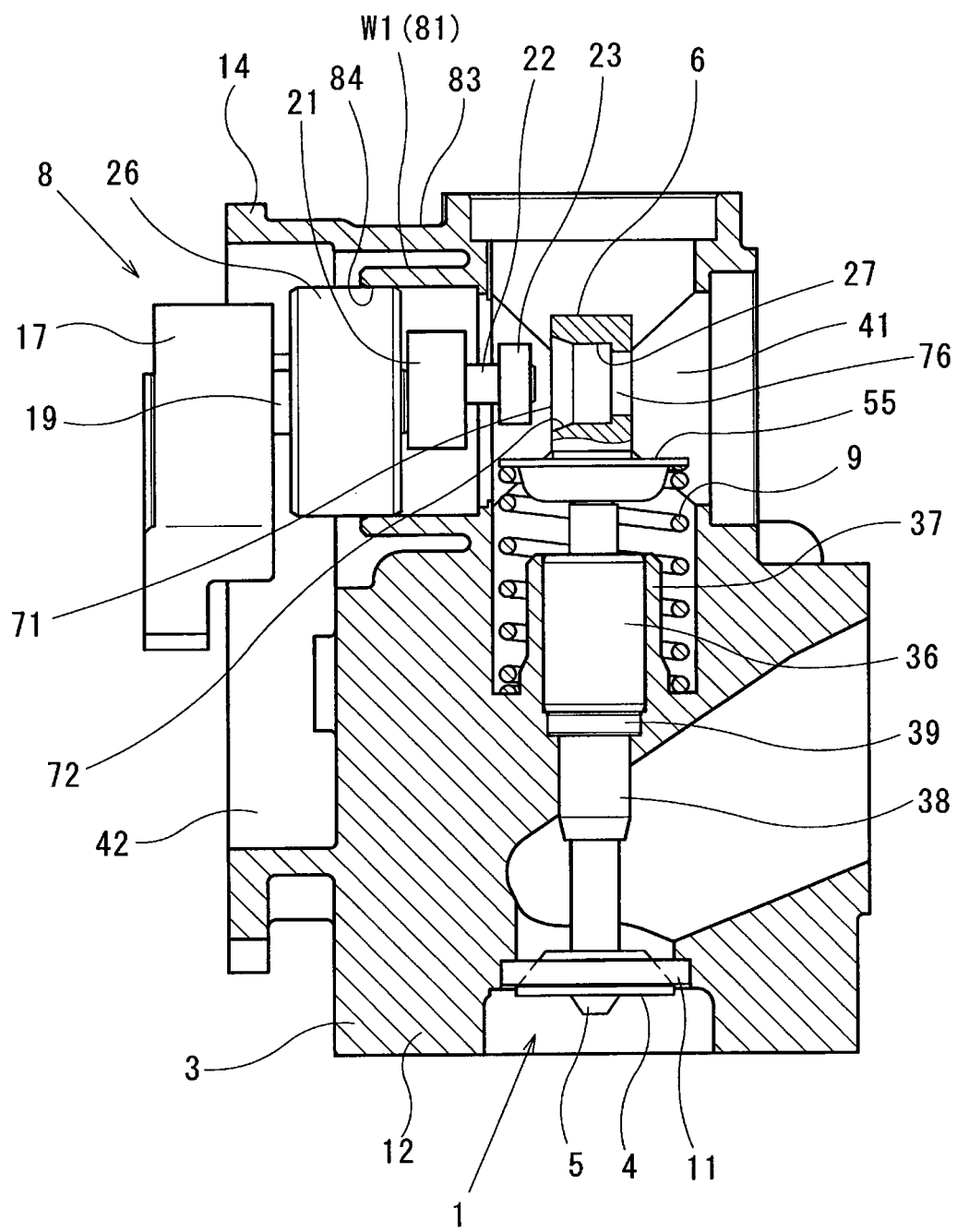
FIG. 10 is a diagram of the attachment process illustrating the method for fitting the follower to the yoke of the first embodiment.
Figure 11:
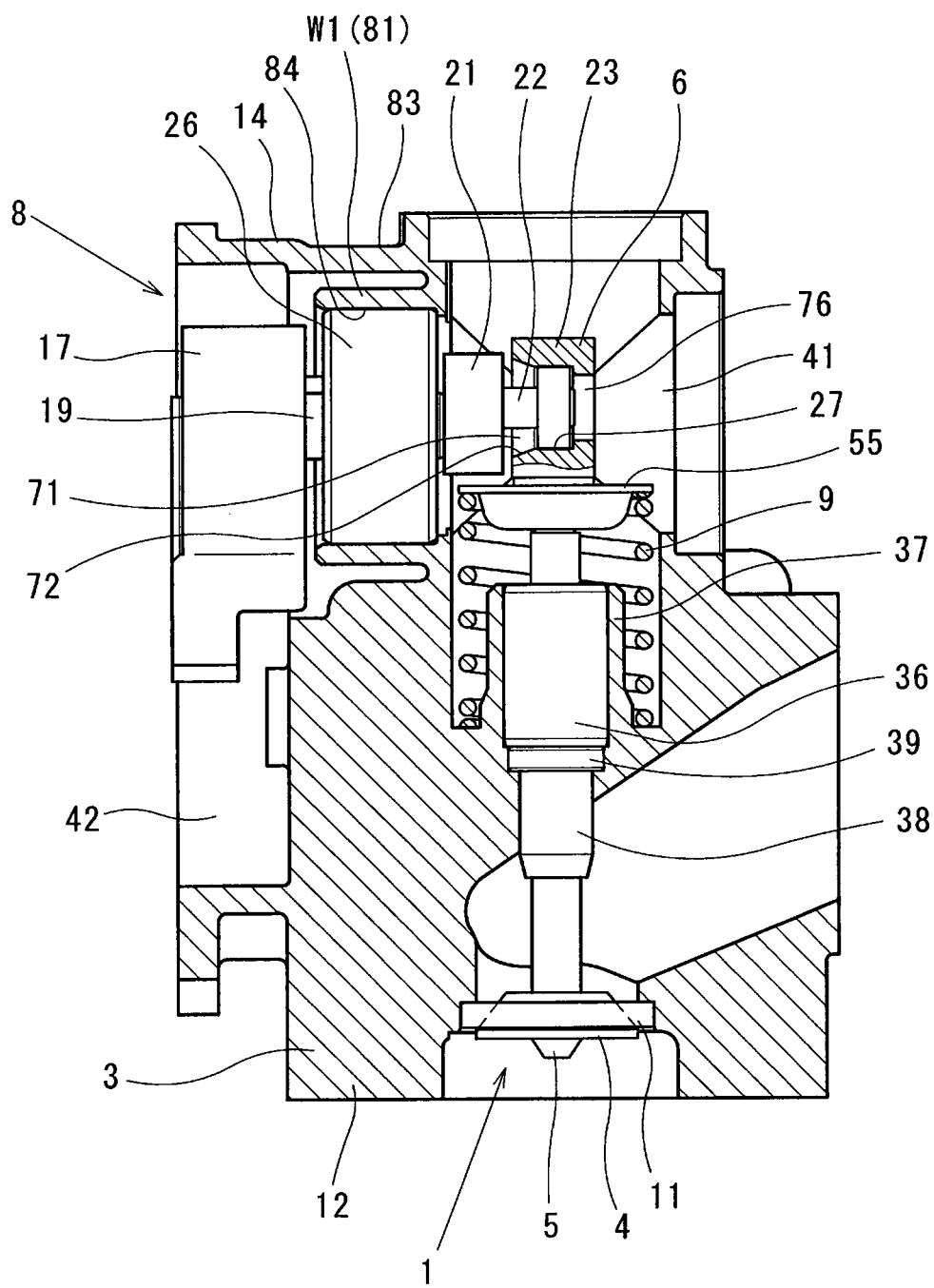
FIG. 11 is a diagram of the attachment process illustrating the method for fitting the follower to the yoke of the first embodiment.

A method for attachment of the EGR control valve of the present first embodiment will be briefly described with reference to FIGS. 1 to 11. FIGS. 9 to 11 are process diagrams illustrating a method for the fitting between the follower and the yoke.

First, as illustrated in FIG. 9, before attaching the output member 8 to the housing 3, the EGR valve 1, the yoke 6, the return spring 9, the valve seat 11, the metal bearing 36, the pipe 38, the oil seal 39, and the spring seat 55 are attached to the housing 3 beforehand (first attachment process).

Figure 8A:
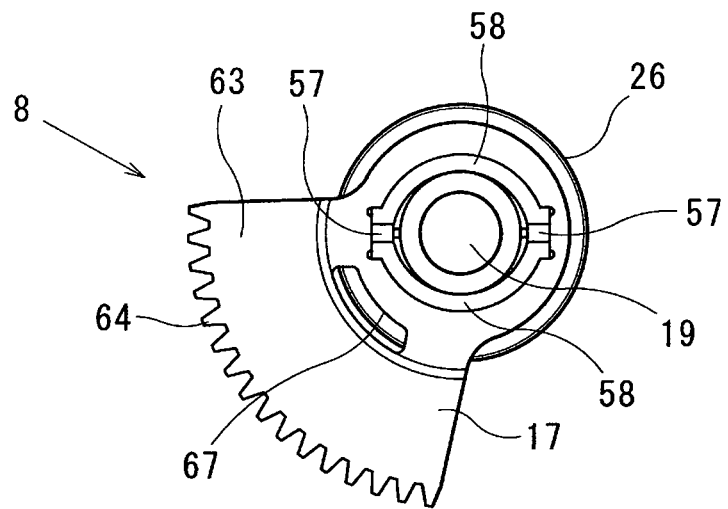
FIG. 8A is a front view illustrating an output gear sub-assembly (output member) according to the first embodiment.
Figure 8B:
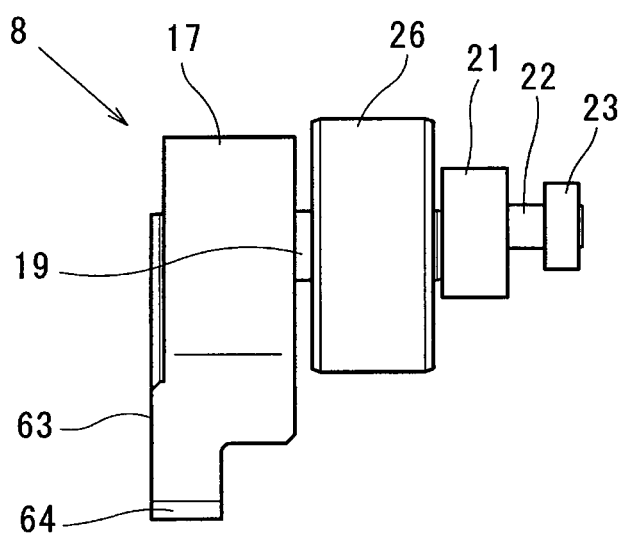
FIG. 8B is a side view illustrating the output gear sub-assembly (output member) of the first embodiment.
Figure 8C:
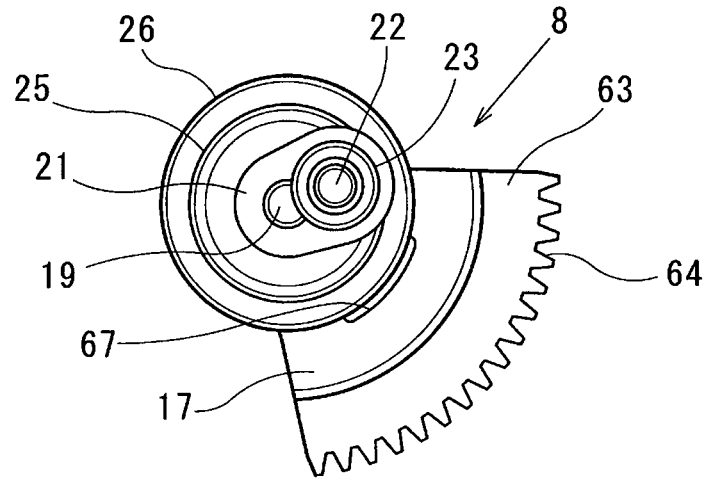
FIG. 8C is a rear view illustrating the output gear sub-assembly (output member) of the first embodiment.
Figure 9:
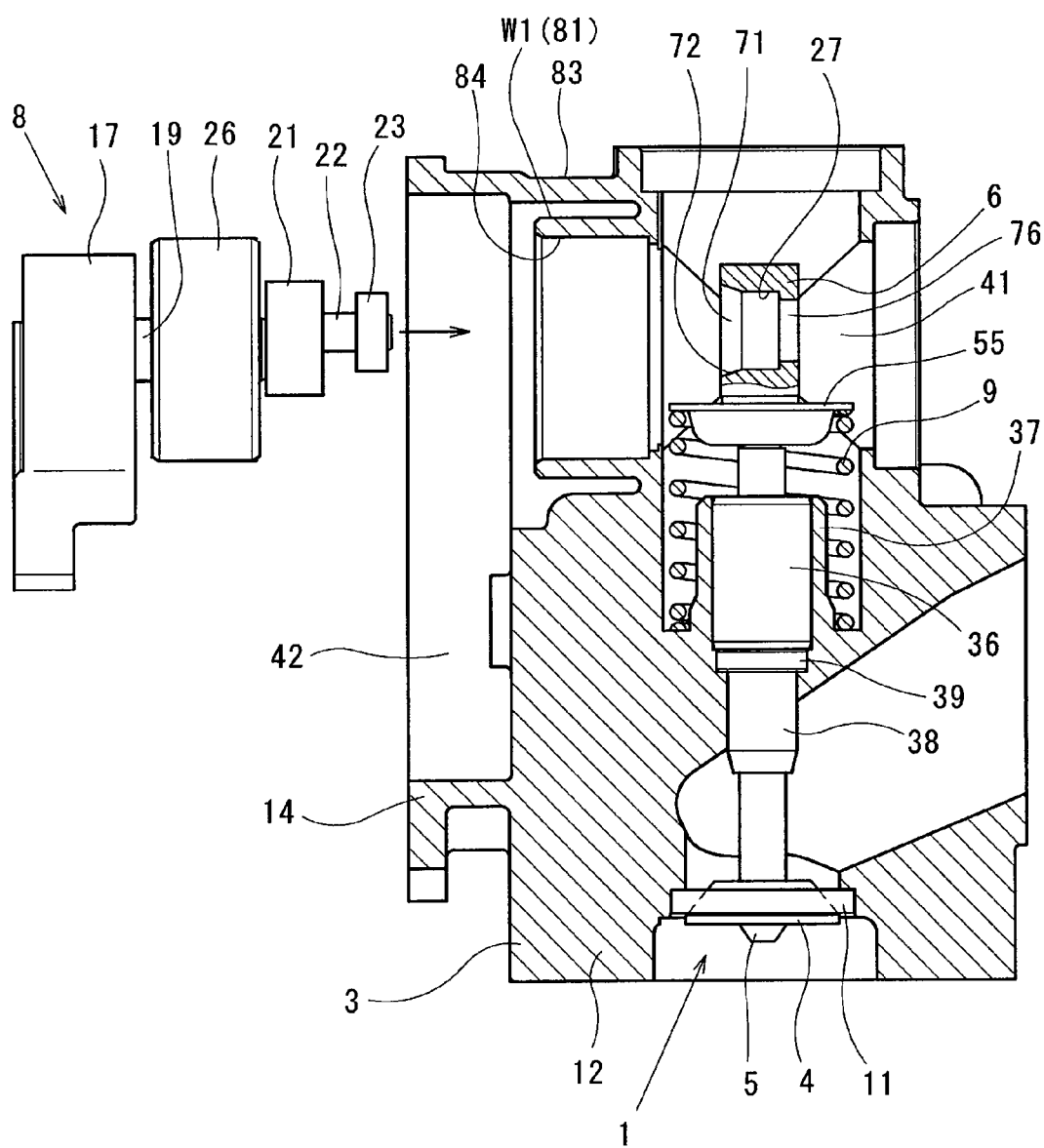
FIG. 9 is a diagram of an attachment process illustrating a method for fitting a follower to a yoke according to the first embodiment.

Next, as illustrated in FIGS. 8A to 9, the first projecting shaft part of the output shaft 19 is fitted into the fitting hole 66 of the output gear 17, to which the magnetic circuit part (the pair of yokes 57, the pair of magnets 58) is fixed. Then, by crimping in a flanged shape a projection part which passes through the fitting hole 66 to project into the cylindrical boss 56, the output gear 17 is fixed to the first projecting shaft part of the output shaft 19.

Subsequently, the inner rings of the double ball bearings 24, 25 are press-fitted and fixed around the outer periphery of the intermediate shaft part of the output shaft 19. After that, the cylindrical collar 26 is press-fitted and fixed around the outer periphery of the outer rings of the double ball bearings 24, 25. The double ball bearings 24, 25 and the cylindrical collar 26 may be attached together before the attachment to the outer periphery of the intermediate shaft part of the output shaft 19.

Next, the first fitting hole of the output lever 21 is fitted to the outer periphery of the second projecting shaft part of the output shaft 19, so that the output lever 21 is fixed to the second projecting shaft part of the output shaft 19. Then, by driving the pivot pin 22 into the second fitting hole of the output lever 21, the follower 23 is press-fitted and fixed around an outer periphery of a part of the pin 22 projecting out of the second fitting hole. In the above-described manner, the output gear 17, the output shaft 19, the output lever 21, the pivot pin 22, the follower 23, the double ball bearings 24, 25, and the cylindrical collar 26 are assembled so as to constitute the output member 8 in which these components are unitized (sub-assy) (second attachment process).

Subsequently, the sensor cover 10 is removed from the opening part of the gear case 14, and with the pressing jig whose part passes through the circular arc window 67 of the output gear 17 pressed on the annular end face of the cylindrical collar 26, the output member 8 is pushed straightly into the housing 3 from the opening part-side of the gear case 14 along its rotation axis direction (arrow direction in FIG. 9). Meanwhile, as illustrated in FIG. 10, an outer periphery of the cylindrical collar 26 is press-fitted and fixed into the bearing accommodating hole 85 of the housing wall W1.

After that, as illustrated in FIG. 11, the follower 23 is in contact with the taper guide surface 72 of the yoke 6 to be guided into the yoke 6 by this taper guide surface 72, so that the follower 23 is inserted smoothly into the yoke groove 6. In this manner, with the yoke groove 27 of the yoke 6, and the pivot pin 22 and the follower 23 fitted (engaged) together at a predetermined engagement position, the EGR valve 1, the yoke 6, and the output member 8 are attached to the housing 3 (third attachment process).

Operation of the EGR control valve of the present first embodiment will be briefly described with reference to FIGS. 1 to 8C. Energization of the motor M which drives the EGR valve 1 of the present embodiment is controlled by the ECU.

If electric power is not supplied to the motor M, the sealing surface of the valve head 4 which is welded and fixed to the output part (outer periphery of the end) of the valve stem 5 in its axial direction is engaged with the valve seat 11 by urging force (spring load) of the return spring 9. Accordingly, the flow passage holes 32 to 34 which are formed in the valve body 12 of the housing 3 are closed. As a result, EGR gas is not mixed into clean intake air (fresh air) which has passed through an air cleaner (EGR cut).

In an operation condition (operation condition of the engine) in which the EGR control valve is opened, valve opening operation is carried out such that the EGR valve 1 is opened at a predetermined valve opening degree (lift amount or stroke amount) corresponding to the operation condition. Then, electric power is supplied to the motor M to rotate the shaft 7 of the motor M in a valve-opening direction. Accordingly, the rotative power (torque) of the motor M is transmitted to the pinion gear 15, the intermediate gear 16, and the output gear 17. After that, the output shaft 19 to which the torque is transmitted from the output gear 17 is rotated by a predetermined rotation angle in the valve-opening direction in accordance with the rotation of the output gear 17. Subsequently, the output lever 21 to which the torque is transmitted from the output shaft 19 is rotated by a predetermined rotation angle (cam angle equal to the operating angle of the output gear 17) in the valve-opening direction in accordance with the rotation of the output shaft 19.

The pivot pin 22 is attached at the projecting end part of the output lever 21, i.e., at a position that is eccentric by a predetermined distance from the central axis of rotation of the output shaft 19. When the output shaft 19 and the output lever 21 rotate, an outer peripheral part (outer ring) of the follower 23 supported by the pivot pin 22 is brought into sliding contact with the groove side face of the yoke groove 27 of the yoke 6. Accordingly, the rotational movement is converted into linear movement. Then, the valve stem 5 and the yoke 6 are displaced in the moving direction against the urging force of the return spring 9. Meanwhile, the valve stem 5 is guided in its moving direction by the metal bearing 36 of the housing 3 Thus, the valve stem 5 is linearly displaced toward the valve-opening side in its axial direction. As a result of the linear displacement of the valve stem 5, the valve head 4 fixed to the outer periphery (distal end outer periphery) of the output part of the valve stem 5 is disengaged from the valve seat 11 of the housing 3 to be lifted by a predetermined lift amount or stroke amount corresponding to the engine operation condition.

As described above, by variably controlling the power (drive current value or applied voltage value) supplied to the motor M corresponding to the engine operation condition, the valve opening degree of the EGR control valve is changed. Accordingly, the amount of EGR gas introduced (mixed) into clean intake air (fresh air) which has passed through an air cleaner is adjusted. Therefore, the EGR valve 1 is valve-opening controlled to a valve opening degree corresponding to a control target value. Consequently, the EGR gas flow passage (flow passage holes 32 to 34) is opened. Thus, EGR gas which is a part of exhaust gas flowing out of each cylinder of the engine is recirculated from a branched part of the exhaust passage formed in the exhaust pipe via the EGR gas flow passage into a merging part of the intake passage formed in the intake pipe. As a consequence, EGR gas is mixed into intake air supplied to each cylinder of the engine, and harmful substances (e.g., NOx) contained in exhaust gas is thereby reduced.

Effects of the first embodiment will be described below. In the EGR control valve described in WO/2012/126876 (conventional EGR control valve), the housing wall does not exist between the output gear and the eccentric, and it is difficult to arrange bearings for slidably supporting the eccentric shaft in its rotation direction. Accordingly, there is caused an insufficient engagement between the intermediate gear and the output gear due to axial deflection of the eccentric shaft. As a result, there is an issue that power of the electric motor is not transmitted effectively to the eccentric and the poppet valve.

In the conventional EGR control valve, the eccentric and the connecting link are in direct contact, and thus there is an issue that sliding loss is large and that the power of the electric motor is not transmitted efficiently to the poppet valve. Furthermore, in the conventional EGR control valve, when attaching together the eccentric and the connecting link, there is an issue that the attachment between the eccentric and the connecting link is difficult and that productivity of the EGR control valve is low.

Accordingly, in the EGR control valve of the present embodiment, the above-described configuration is employed for the purposes of easy arrangement of the double ball bearings 24, 25 for rotatably supporting the output shaft 19 of the output member 8, efficient transmission of the rotative power of the motor M to the EGR valve 1 and the yoke 6, and an improved state of engagement between the intermediate gear 16 and the output gear 17 in the deceleration mechanism, and for the purpose of easy attachment between the follower and the yoke.

Specifically, for the housing 3 in which the EGR valve 1 and the actuator 2 are incorporated, there are provided the housing walls W1, W2 for dividing the first accommodating chamber 41, in which the EGR valve 1 and the link mechanism are accommodated, from the second accommodating chamber 42, in which the motor M and the deceleration mechanism are accommodated. For the housing wall W1, there are provided the double ball bearings 24, 25 which rotatably support the output shaft 19 via the cylindrical collar 26, and the cylindrical bearing holder 81 which holds the outer periphery of the respective outer rings of these double ball bearings 24, 25.

By providing the bearing holder 81 integrally with the housing wall W1 which divides the first accommodating chamber 41 from the second accommodating chamber 42, arrangement of the double ball bearings 24, 25, the cylindrical collar 26, and the bearing holder 81 becomes very easy. Accordingly, the axial deflection of the output shaft 19 can be limited, so that there is improved an engagement between the intermediate gear 16 and the output gear 17 on the motor side for transmitting the rotative power of the motor M to the output gear 17. As a result, the rotative power of the motor M can be transmitted effectively to the valve head 4, the valve stem 5, and the yoke 6 which constitute the EGR valve 1.

By providing for the housing 3 the housing walls W1, W2 for dividing the first accommodating chamber 41 from the second accommodating chamber 42, the motor M including the external connection parts (conductively joining parts) of the first and second brush terminals 51, 52 for making the electric connection to the first and second motor terminals of the connector for external connection, and the output gear 17 which rotates upon reception of the rotative power of the motor M from the intermediate gear 16 due to engagement with the intermediate gear 16 can be divided air-tightly and liquid-tightly from the valve sub-assembly (valve shaft part) constituted of the EGR valve 1, the yoke 6, the output lever 21, the pivot pin 22, the follower 23, and so forth.

Accordingly, a small amount of corrosive gas (corrosive gas such as carbon monoxide (CO), sulfur dioxide (SO2), nitrogen oxides (NOx) contained in exhaust gas) leaking out from the flow passage holes 32 to 34 into the first accommodating chamber 41 through a clearance between the outer periphery of the valve stem 5 of the EGR valve 1 and the sealing rubber (seal part) of the oil seal 39 held by the bearing holder 37 of the housing 3 can be prevented from entering into the second accommodating chamber 42. As a result, there can be prevented a defective conduction or contact deterioration of the conductively joining parts between the first and second brush terminals 51, 52 of the motor M and the first and second motor terminals of the connector for external connection.

By press-fitting the cylindrical collar 26 around the outer periphery of the respective outer rings of the double ball bearings 24, 25, the output member 8 is assembled in a state of the sub-assembly. The outer diameter of the cylindrical collar 26 is set to be equal to or larger than the enveloping circle with the shaft center (central axis of rotation) of the output shaft 19 serving as its center enveloping the output lever 21, the pivot pin 22, and the follower 23. The taper guide surface 72 for guiding the follower is provided for the opening part 71 of the yoke 6. Accordingly, when press-fitting the cylindrical collar 26 into the housing wall W1 of the housing 3, the follower 23 can be inserted into the yoke groove 27 from the axial direction of the output shaft 19. As a result, attachment of the pivot pin 22 and the follower 23 to the yoke 6 is facilitated. Consequently, attachment of the output member 8 to the EGR valve 1 and the housing 3 becomes easy, so that productivity of the EGR control valve can be improved.

In case of the housing wall W1 of the housing 3 being made of aluminum die casting, by use of a material (e.g., stainless steel) having a resilient modulus and linear expansion coefficient similar to the respective outer rings of the double ball bearings 24, 25 for the cylindrical collar 26, even though the cylindrical collar 26 is press-fitted into the inner periphery of the housing wall W1 of the housing 3 (bearing accommodating hole 84 of the bearing holder 81), the respective outer rings of the double ball bearings 24, 25 and the cylindrical collar 26 are not easily deformed in their thickness direction, for example. Accordingly, there is produced an effect of decreasing the surface pressure of the rolling element (ball) due to the prevention of reduction of a clearance between the bearing rings (bearing internal gap) after the cylindrical collar 26 is press-fitted.

Between the outer periphery of the cylindrical boss 56 of the output gear 17 and the inner periphery of the teeth formation part 63, there is provided the circular arc window 67 through which the outer diameter of the cylindrical collar 26 can be viewed. Accordingly, when the cylindrical collar 26 is press-fitted into the inner periphery of the housing wall W1 of the housing 3 (bearing accommodating hole 84 of the bearing holder 81), a part of the pressing jig for holding the annular end face of the cylindrical collar 26 can be inserted. As a consequence, inclined press-fitting of the cylindrical collar 26 into the housing wall W1 can be limited. Additionally, the valve stem 5 of the EGR valve 1 can be disposed on a lateral side of the motor M. Hence, a size of the EGR control valve is made compactible.

Second Embodiment

Configuration of an EGR control valve of a second embodiment will be described below. FIGS. 12 to 15 illustrate the EGR control valve of the second embodiment that is used for an exhaust gas recirculation system (EGR system) for the engine to which the invention is applied. The same reference numeral as the first embodiment indicates the same corresponding configuration or function, and its explanation will be omitted.

Similar to the first embodiment, a link mechanism of an actuator 2 of the present embodiment includes a yoke 6, an output lever 21, a pivot pin 22, and a follower 23. Upon reception of rotative power of a motor M from the pivot pin 22 through the follower 23, the yoke 6 reciprocates in the axial direction of a valve stem 5, and a fitting part 74 is press-fitted to a proximal end part (input part) of the valve stem 5 in its axial direction. Accordingly, the yoke 6 is connected to an EGR valve 1 to be movable integrally with the valve 1. Thus, the yoke 6 converts the rotative power of the motor M into linear movement to reciprocate the EGR valve 1.

For an input part of the yoke 6, there is provided a U-shaped yoke groove 27 into which the follower 23 supported by the pivot pin 22 can be detachably inserted. This yoke groove 27 is a recessed groove that opens on at least side faces of two surfaces and extends from an opening part 91 of a side face of one surface of the two surfaces toward a rear side. Furthermore, this recessed groove is a radial groove (recessed groove extending in a direction perpendicular to the axial direction of the valve stem 5) into which the follower 23 supported by the pivot pin 22 can be detachably inserted.

The input part of the yoke 6 has a polyhedral shape (horseshoe shape in section) including at least four (first to fourth) side surfaces in addition to two surfaces opposed in a direction parallel to a rotation axis direction of an output member 8. A slit (opening part) having generally the same shape (U shape) as the yoke groove 27 is provided for the two surfaces opposed in the direction parallel to the rotation axis direction of the output member 8. The follower 23 can be seen through this slit. For the first side surface of the input part, there is provided a side opening part that opens in the direction perpendicular to the axial direction of the valve stem 5.

The yoke groove 27 includes an opening part 91 for inserting the follower 23 into the yoke groove 27 with the output member 8 being rotated at the time of attachment of the output member 8, especially the follower 23, to the yoke 6. This opening part 91 opens at one end of the yoke groove 27 in its longitudinal direction, and is opened in the opposite direction of a direction perpendicular to the axial direction of the valve stem 5 of the EGR valve 1, particularly an insertion direction in which the pivot pin 22 and the follower 23 are inserted at the time of attachment. For the opening part 91, there is provided a taper guide surface 92 whose opening area gradually becomes small from its opening side toward the rear side of the yoke groove 27 and which leads (guides) the follower 23 into the yoke groove 27.

A method for attachment of the EGR control valve of the present second embodiment will be briefly described in reference to FIGS. 12 to 15. FIGS. 12 to 15 are process diagrams illustrating a method for the fitting between the follower and the yoke.

Figure 12:
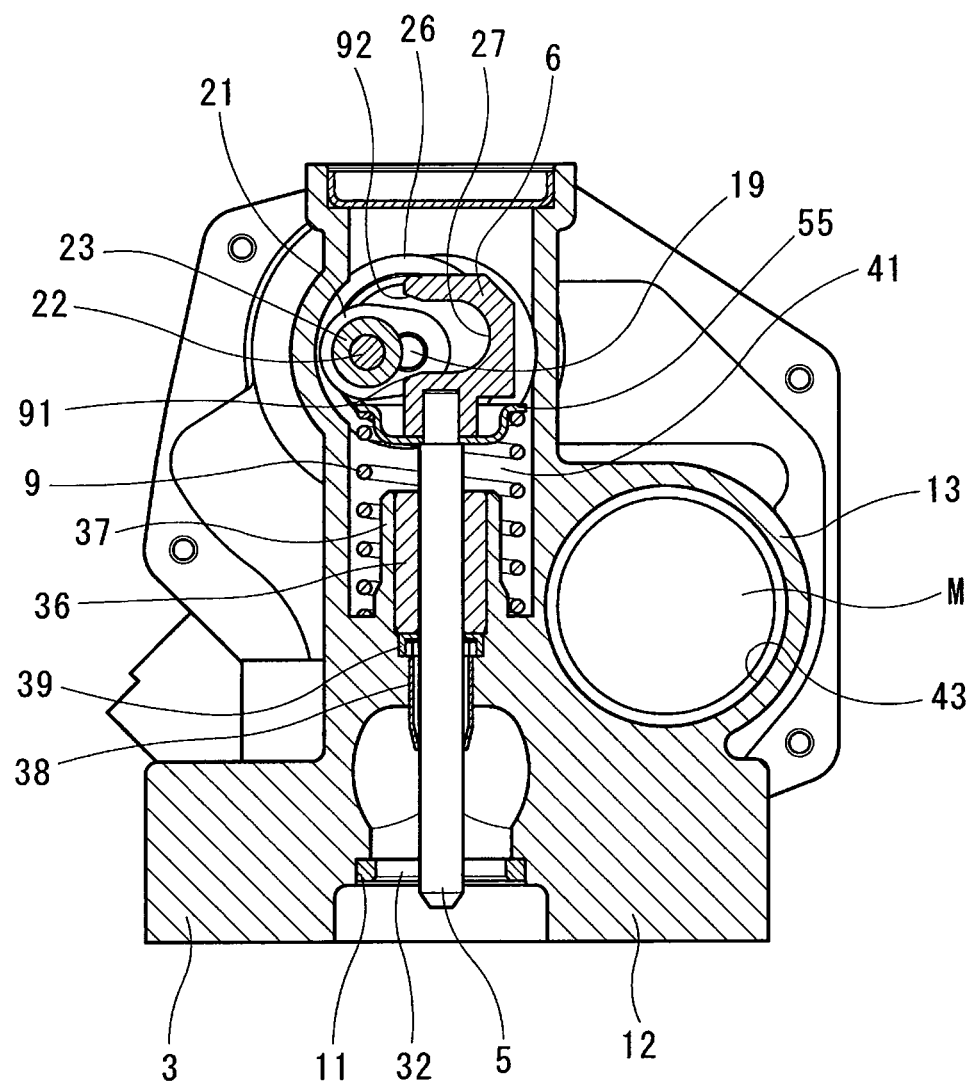
FIG. 12 is a diagram of an attachment process illustrating a method for fitting a follower to a yoke in accordance with a second embodiment.

First, as illustrated in FIG. 12, before welding and fixing a valve head 4 to the valve stem 5, the valve stem 5, the yoke 6, a return spring 9, a valve seat 11, a metal bearing 36, a pipe 38, a oil seal 39, and a spring seat 55 are attached beforehand to a housing 3 (first attachment process). Then, as illustrated in FIG. 12, an output gear 17, an output shaft 19, the output lever 21, the pivot pin 22, the follower 23, double ball bearings 24, 25, and a cylindrical collar 26 are assembled in advance so as to constitute the output member 8 in which these components are unitized (sub-assy) (second attachment process).

Next, a sensor cover 10 is removed from an opening part of a gear case 14, and with a pressing jig whose part passes through a circular arc window 67 of the output gear 17 pressed on an annular end face of the cylindrical collar 26, the output member 8 is pushed straightly into the housing 3 from the opening part-side of the gear case 14 along its rotation axis direction. Accordingly, an outer periphery of the cylindrical collar 26 is press-fitted and fixed into a bearing accommodating hole 85 of a housing wall W1. Meanwhile, the output shaft 19 and the output lever 21 are rotated beforehand in a counterclockwise direction in FIG. 12 such that the pivot pin 22 and the follower 23 are not fitted into the yoke groove 27 of the yoke 6, i.e., such that the follower 23 is not in contact with the input part of the yoke 6 (third attachment process).

Figure 13:
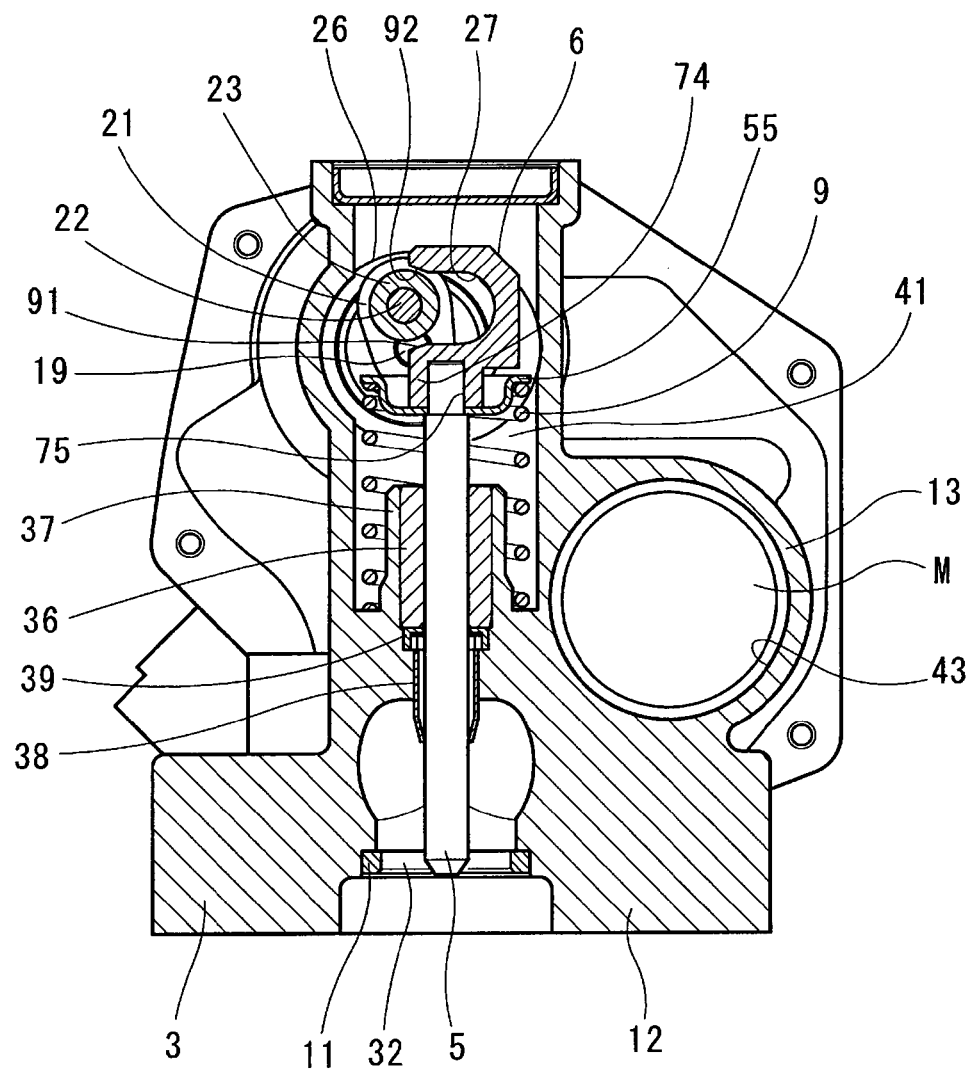
FIG. 13 is a diagram of the attachment process illustrating the method for fitting the follower to the yoke of the second embodiment.
Figure 14:
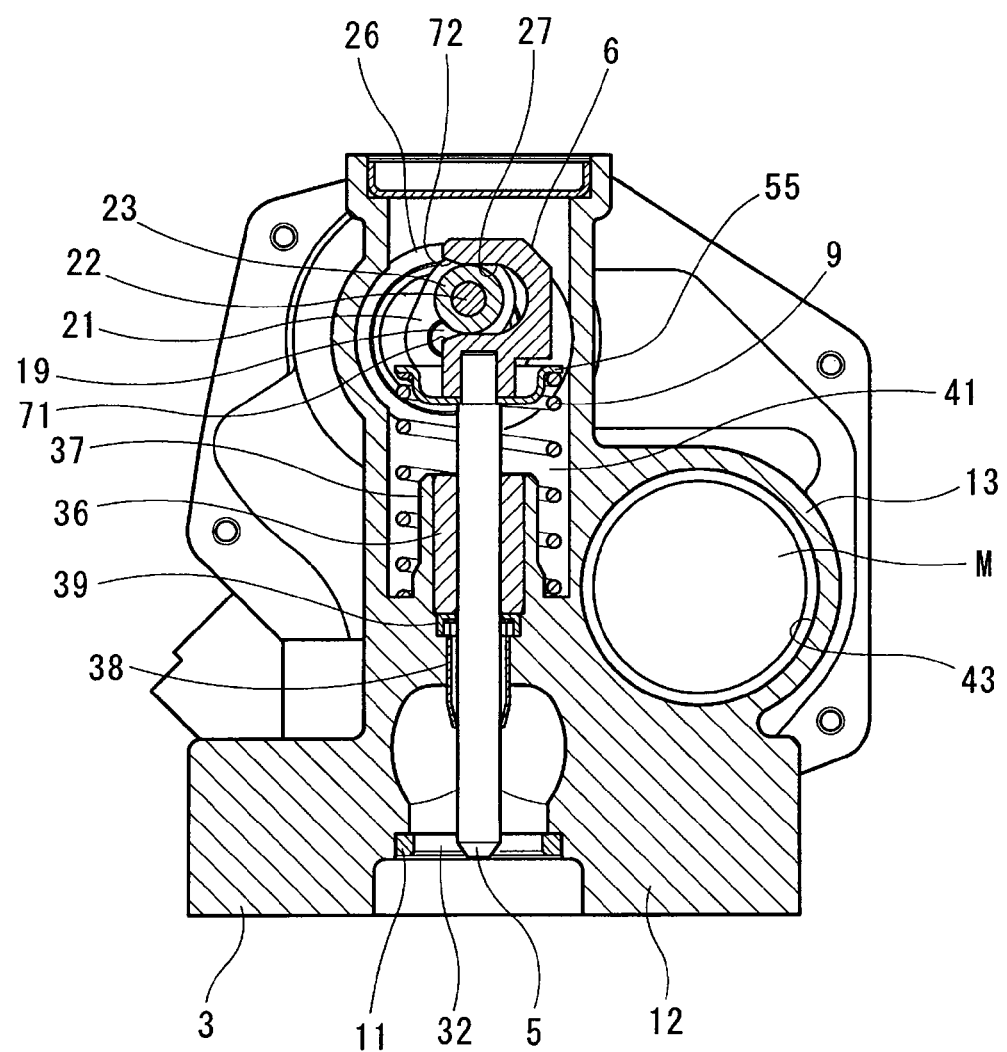
FIG. 14 is a diagram of the attachment process illustrating the method for fitting the follower to the yoke of the second embodiment.

Subsequently, when the output shaft 19 and the output lever 21 are rotated in a clockwise direction in FIG. 13, the follower 23 slots into the opening part 91 of the yoke 6. By bringing the follower 23 into contact with the taper guide surface 92 of the yoke 6, the yoke 6 is mounted on an outer periphery of the follower 23. Accordingly, the yoke 6 is lifted slightly toward an upper side in FIG. 13 along with the valve stem 5 (fourth attachment process). After that, when the output shaft 19 and the output lever 21 are rotated in a clockwise direction in FIG. 14, the follower 23 is inserted into the yoke groove 27 of the yoke 6 (fifth attachment process).

Figure 15:
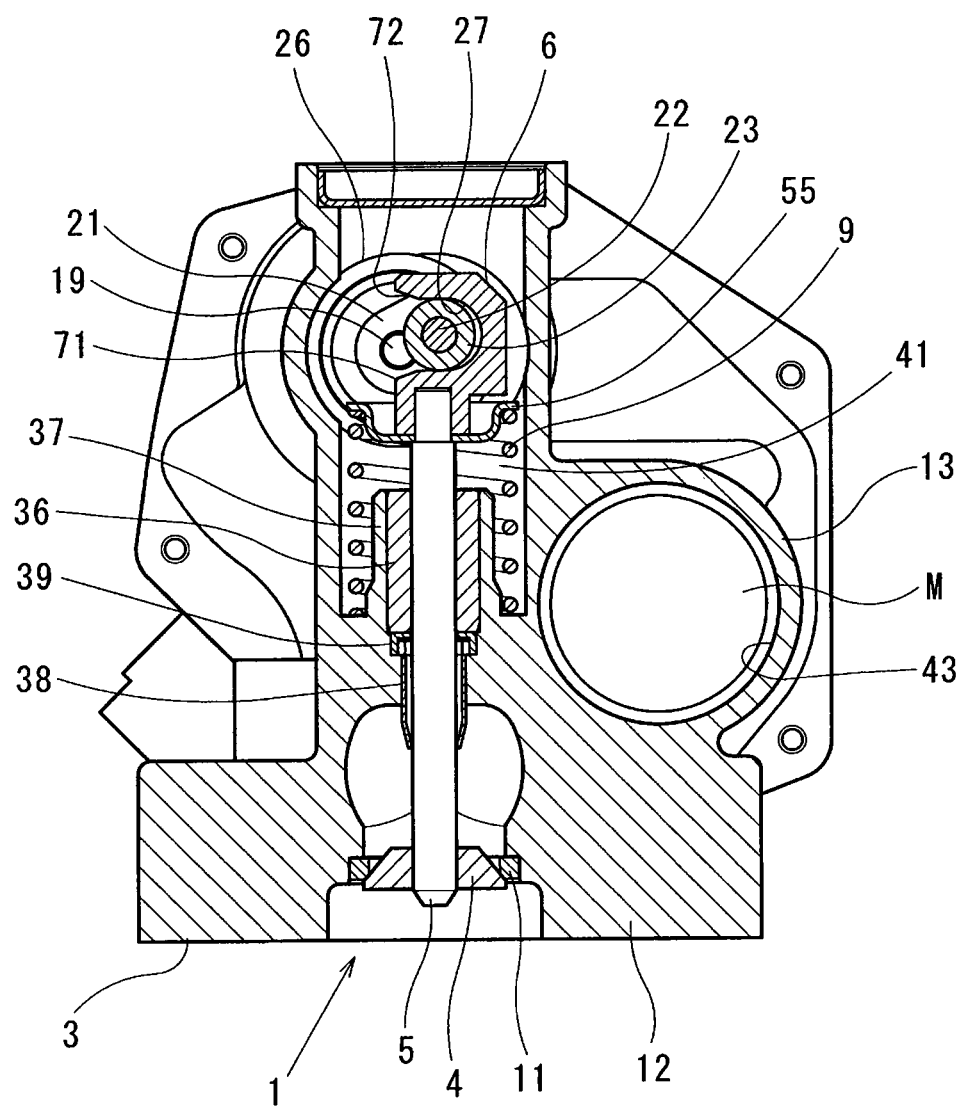
FIG. 15 is a diagram of the attachment process illustrating the method for fitting the follower to the yoke of the second embodiment.

Then, in a stage where the output shaft 19 and the output lever 21 are rotated in a clockwise direction in FIG. 15 to enter toward a rear side of the yoke groove 27 of the yoke 6, the valve head 4 is welded and fixed to the valve stem 5. In this manner, with the yoke groove 27 of the yoke 6, and the pivot pin 22 and the follower 23 fitted (engaged) together at an predetermined engagement position, the EGR valve 1, the yoke 6, and the output member 8 are attached to the housing 3 (sixth attachment process).

Effects of the second embodiment will be described below. As described above, in the EGR control valve of the present embodiment, for the housing 3 of the EGR control valve, there are provided the housing walls W1, W2 for dividing a first accommodating chamber 41, in which the EGR valve 1 and a conversion mechanism are accommodated, from a second accommodating chamber 42, in which the motor M and a deceleration mechanism are accommodated. Moreover, for the housing wall W1, there are provided the double ball bearings 24, 25 which rotatably support the output shaft 19 via the cylindrical collar 26, and a cylindrical bearing holder 81 which holds an outer periphery of respective outer rings of these double ball bearings 24, 25. Accordingly, similar effects to the first embodiment can be produced.

The input part of the yoke 6 has a polyhedral shape (horseshoe shape in section) including at least four (first to fourth) side surfaces in addition to the two opposed surfaces. By press-fitting the cylindrical collar 26 around the outer periphery of the respective outer rings of the double ball bearings 24, 25, the output member 8 is assembled in a state of the sub-assembly. The outer diameter of the cylindrical collar 26 is set to be equal to or larger than the enveloping circle with the shaft center (central axis of rotation) of the output shaft 19 serving as its center enveloping the output lever 21, the pivot pin 22, and the follower 23. The taper guide surface 92 for guiding the follower is provided for the opening part 91 of the yoke 6.

Accordingly, the output member 8 is attached to the housing 3 in such a manner that the cylindrical collar 26 is press-fitted and fixed between the outer periphery of the respective outer rings of the double ball bearings 24, 25 and an inner periphery of the housing wall W1 of the housing 3 in a position where the pivot pin 22 and the follower 23 are not fitted into the yoke groove 27 of the yoke 6 (location off the groove 27). Then, the output shaft 19 and the output lever 21 are rotated in a clockwise direction in FIG. 15. As a result, the pivot pin 22 and the follower 23 can be slidably inserted into the yoke groove 27 of the yoke 6. Consequently, attachment of the pivot pin 22 and the follower 23 to the yoke 6 is facilitated. Consequently, attachment of the output member 8 to the EGR valve 1 and the housing 3 becomes easy, so that productivity of the EGR control valve can be improved.

Modifications to the above embodiments will be described below. In the present embodiments, the exhaust control valve used for the exhaust system of the present disclosure is applied to the EGR control valve incorporated into the exhaust gas recirculation system for the engine. Alternatively, the exhaust control valve used for the exhaust system of the present disclosure may be applied to, for example, a wastegate valve, a scroll changeover valve, an exhaust flow control valve, an exhaust pressure control valve, an exhaust changeover valve, or an exhaust throttle valve, which is incorporated into the exhaust system of the engine.

The poppet valve is employed as the valving element of the EGR control valve or the exhaust control valve. Alternatively, through a link mechanism intervening between a valve and a shaft, a rotary type valve such as a butterfly valve, a flap valve, a plate valve, or a rotary valve may be employed. Furthermore, a double poppet valve may be employed. Additionally, instead of the valve stem 5, an operating rod extending in the axial direction may be used as the shaft (valve stem).

In the present embodiments, the cylindrical collar 26 is press-fitted and fixed around the outer periphery of the respective outer rings of the double ball bearings 24, 25 in advance before press-fitting the cylindrical collar 26 into the inner periphery of the housing wall W1 of the housing 3, i.e., the inside of the bearing accommodating hole 84 of the bearing holder 81. Alternatively, before the attachment of the output gear 17 to the first projecting shaft part (input part) of the output shaft 19, after the cylindrical collar 26 is attached around the outer periphery of the respective outer rings of the double ball bearings 24, 25, the cylindrical collar 26 may be press-fitted and fixed into the inner periphery of the housing wall W1 of the housing 3.

In the present embodiments, the cylindrical bearing holder (first bearing holder) 81 for holding the outer periphery of respective outer rings of the double ball bearings (first bearing) 24, 25 via the cylindrical collar 26 is provided for the housing wall W1 of the housing 3. Alternatively, without the cylindrical collar 26 intervening, the cylindrical first bearing holder for directly holding (supporting) the outer periphery of the first bearing may be provided for the housing wall W1 of the housing 3.

As the first bearing, in place of the double ball bearings 24, 25, a ball bearing having therein lubricating oil may be employed. Furthermore, as the first bearing, a cylindrical oil-impregnated sintered bearing (metal bush) with lubricating oil impregnated therein may be employed. In addition, there may be employed a bearing of such a type as to supply lubricating oil by a lubricating oil feeding mechanism to a first sliding part (sliding clearance) between the first bearing and the output shaft, and a second sliding part (sliding clearance) between the second bearing and the valve stem without lubricating oil impregnated in the first and second bearings.

The output lever 21, the pivot pin 22, and the follower 23 may be assembled so as to constitute a follower sub-assembly in which these components are unitized (sub-assy) in advance before attaching the output lever 21 to the second projecting shaft part (output part) of the output shaft 19, and the follower sub-assembly may be attached to the second projecting shaft part (output part) of the output shaft 19. A follower roller supported rotatably by an outer periphery of the pivot pin 22 may be used as substitute for the follower 23 which is constituted of a ball bearing.

In addition, as the internal combustion engine (engine), a multi-cylinder gasoline engine may be used in exchange for the multi-cylinder diesel engine. Furthermore, the present disclosure may be applied to a single cylinder engine. The conductor connected to the coil may be a brush in pressing contact with a commutator electrically-connected to a rotor coil of a motor. The conductor which is formed into the coil may be a stator coil of a motor.

To sum up, the exhaust system for an internal combustion engine of the above embodiments can be described as follows.

An exhaust system for an internal combustion engine includes a housing 3, a valve 1, an actuator 2, a first accommodating chamber 41, and a second accommodating chamber 42-44. The housing 3 includes a flow passage 31-35 through which exhaust gas from the engine flows. The valve 1 includes a valving element 4 and a valve stem 5. The valving element 4 is configured to open or close the flow passage 31-35. The valve stem 5 supports the valving element 4. The actuator 2 includes a motor M and an output member 8. The motor M is configured to generate power for driving the valve 1 upon supply of electric power to the motor M. The output member 8 is configured to transmit the power generated by the motor M to the valving element 4 via the valve stem 5. The valve 1 and the actuator 2 are incorporated in the housing 3. The output member 8 includes an output gear 17, an output shaft 19, and a follower 23. The output gear 17 is configured to receive the power of the motor M so as to rotate. The output shaft 19 is disposed on a central axis of the rotation of the output gear 17 and coupled with the output gear 17 to be rotatable integrally with the output gear 17. The follower 23 is disposed eccentrically relative to the central axis of the rotation of the output shaft 19 and connected to the output shaft 19 to be rotatable integrally with the output shaft 19. The first accommodating chamber 41 accommodates at least the valve stem 5 and the follower 23. The second accommodating chamber 42-44 accommodates at least the motor M and the output gear 17. The housing 3 further includes a housing wall W1, W2 that divides the first accommodating chamber 41 from the second accommodating chamber 42-44. The housing wall W1, W2 includes a first bearing 24, 25 and a cylindrical first bearing holder 81. The first bearing 24, slidably supports the output shaft 19 in its rotation direction. The first bearing holder 81 holds outer periphery of the first bearing 24, 25. Accordingly, by providing the first bearing holder 81 for the housing walls W1, W2 for dividing the first accommodating chamber 41 from the second accommodating chamber 42 to 44, arrangement of the first bearing 24, 25 and the first bearing holder 81 becomes very easy. As a result, the axial deflection of the output shaft 19 can be limited so as to improve the engagement between the motor-side gear for transmitting the power of the motor M to the output gear 17, and the output gear 17. Thus, the power of the motor M can be transmitted efficiently to the yoke 6 and the valve 1.

As a result of the housing walls W1, W2 for dividing the first accommodating chamber 41 from the second accommodating chamber 42 to 44, for example, the motor M including the conductively joining part for making an electric connection to the outside and the output gear 17 which rotates upon reception of the power of this motor M can be divided from the valve 1 (at least valve stem 5) and the follower 23. Accordingly, a small amount of corrosive gas leaking out from the flow passage 31 to 35 through a clearance (e.g., seal part) between the valve stem 5 of the valve 1 and the housing 3 into the first accommodating chamber 41 (corrosive gas contained in exhaust gas) can be prevented from entering the second accommodating chamber 42 to 44. Therefore, a defective conduction or contact deterioration of the conductively joining part between the motor M and the outside can be prevented.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. An exhaust system for an internal combustion engine, comprising:
   a housing that includes a flow passage through which exhaust gas from the engine flows;
   a valve that includes:
      a valving element configured to open or close the flow passage; and
      a valve stem supporting the valving element;
   an actuator that includes:
      a motor configured to generate power for driving the valve upon supply of electric power to the motor; and
      an output member configured to transmit the power generated by the motor to the valving element via the valve stem, wherein:
   the valve and the actuator are incorporated in the housing; and
   the output member includes:
      an output gear configured to receive the power of the motor so as to rotate;
      an output shaft disposed on a central axis of the rotation of the output gear and coupled with the output gear to be rotatable integrally with the output gear; and
      a follower disposed eccentrically relative to the central axis of the rotation of the output shaft and connected to the output shaft to be rotatable integrally with the output shaft;
   a first accommodating chamber that accommodates at least the valve stem and the follower; and a second accommodating chamber that accommodates at least the motor and the output gear, wherein:
the housing further includes a housing wall that divides the first accommodating chamber from the second accommodating chamber; and
the housing wall includes:
a first bearing slidably supporting the output shaft in its rotation direction; and
a cylindrical first bearing holder holding outer periphery of the first bearing.

2. The exhaust system according to claim 1, wherein the housing further includes:
a cylindrical second bearing slidably supporting the valve stem in its moving direction; and
a cylindrical second bearing holder holding outer periphery of the second bearing.

3. The exhaust system according to claim 1, wherein the actuator further includes:
a deceleration mechanism configured to reduce rotation of the motor to transmit the reduced rotation to the output shaft; and
a conversion mechanism configured to convert rotational movement of the output shaft into linear movement of the valve stem.

4. The exhaust system according to claim 3, wherein:
the conversion mechanism includes:
a lever that is coupled with the output shaft to be rotatable integrally with the output shaft and projects radially outward of the output shaft;
an eccentric pin held by the lever; and
a yoke that is configured to receive the power of the motor from the eccentric pin via the follower so as to reciprocate in an axial direction of the valve stem and that is coupled with the valve stem to be movable integrally with the valve stem; and
the follower is supported rotatably by outer periphery of the eccentric pin and is inserted slidably in the yoke.

5. The exhaust system according to claim 4, wherein:
the yoke includes a yoke groove into which the follower is capable of being inserted;
the yoke groove includes an opening part through which the follower is inserted into the yoke groove with the output member being linearly displaced when attaching the follower to the yoke; and
the opening part opens in a direction perpendicular to the axial direction of the valve stem.

6. The exhaust system according to claim 5, wherein the opening part includes a taper guide surface whose opening area gradually becomes small from its opening side toward a rear side of the yoke groove and which guides the follower into the yoke groove.

7. The exhaust system according to claim 4, wherein:
the housing wall further includes a cylindrical collar that is press-fitted around the outer periphery of the first bearing; and
the collar has an outer diameter equal to or larger than an enveloping circle with a shaft center of the output shaft serving as its center enveloping the lever, the eccentric pin, and the follower.

8. The exhaust system according to claim 7, wherein the output gear includes a window through which the outer diameter of the collar is capable of being viewed.

9. The exhaust system according to claim 4, wherein:
one end side of the output shaft in its axial direction projects from an open end on the first accommodating chamber-side into the first accommodating chamber to be coupled with the lever rotatably integrally therewith; and
the other end side of the output shaft in its axial direction projects from an open end on the second accommodating chamber-side into the second accommodating chamber to be coupled with the output gear rotatably integrally therewith.

10. The exhaust system according to claim 3, wherein:
the conversion mechanism includes:
a lever that is connected to the output shaft to be rotatable integrally with the output shaft and projects radially outward of the output shaft;
an eccentric pin held by the lever; and
a horseshoe-shaped yoke that is configured to receive the power of the motor from the eccentric pin via the follower so as to reciprocate in an axial direction of the valve stem and that is coupled with the valve stem to be movable integrally with the valve stem; and
the follower is supported rotatably by outer periphery of the eccentric pin and is inserted slidably in the yoke.

11. The exhaust system according to claim 10, wherein:
the yoke includes a yoke groove into which the follower is capable of being inserted;
the yoke groove includes an opening part through which the follower is inserted into the yoke groove with the output member being rotated when attaching the follower to the yoke; and
the opening part opens in a direction perpendicular to the axial direction of the valve stem.

12. The exhaust system according to claim 11, wherein the opening part includes a taper guide surface whose opening area gradually becomes small from its opening side toward a rear side of the yoke groove and which guides the follower into the yoke groove.

13. The exhaust system according to claim 10, wherein:
the housing wall further includes a cylindrical collar that is press-fitted around the outer periphery of the first bearing; and
the collar has an outer diameter equal to or larger than an enveloping circle with a shaft center of the output shaft serving as its center enveloping the lever, the eccentric pin, and the follower.

14. The exhaust system according to claim 13, wherein the output gear includes a window through which the outer diameter of the collar is capable of being viewed.

15. The exhaust system according to claim 10, wherein:
one end side of the output shaft in its axial direction projects from an open end on the first accommodating chamber-side into the first accommodating chamber to be coupled with the lever rotatably integrally therewith; and
the other end side of the output shaft in its axial direction projects from an open end on the second accommodating chamber-side into the second accommodating chamber to be coupled with the output gear rotatably integrally therewith.

16. The exhaust system according to claim 1, further comprising a cover, wherein:
the motor includes a coil and a terminal that is conductively joined to a conductor connected to the coil or to a conductor formed into the coil;
the cover includes a connector for external connection for making an electric connection between the motor and an external device through the terminal; and the housing further includes a recessed part configured as the second accommodating chamber between the housing and the cover.

* * * * *